United States Patent
Albertson et al.

(10) Patent No.: US 10,594,481 B2
(45) Date of Patent: Mar. 17, 2020

(54) REPLICATED ENCRYPTED DATA MANAGEMENT

(71) Applicant: International Business Machines Corporation, Armonk, NY (US)

(72) Inventors: Aaron T. Albertson, Rochester, MN (US); Robert Miller, Rochester, MN (US); Brian A. Nordland, Rochester, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 15/438,714

(22) Filed: Feb. 21, 2017

(65) Prior Publication Data
US 2018/0241561 A1   Aug. 23, 2018

(51) Int. Cl.
  *H04L 9/08*   (2006.01)
  *H04L 9/16*   (2006.01)
  *H04L 29/06*  (2006.01)
  *H04L 29/08*  (2006.01)

(52) U.S. Cl.
  CPC .......... *H04L 9/0891* (2013.01); *H04L 9/0861* (2013.01); *H04L 9/16* (2013.01); *H04L 63/0428* (2013.01); *H04L 63/06* (2013.01); *H04L 67/1097* (2013.01)

(58) Field of Classification Search
  None
  See application file for complete search history.

(56) References Cited

U.S. PATENT DOCUMENTS

| | | | |
|---|---|---|---|
| 6,044,155 A    | 3/2000  | Thomlinson et al. | |
| 6,915,434 B1 * | 7/2005  | Kuroda ............. | H04L 9/0833 380/278 |
| 8,612,439 B2   | 12/2013 | Prahlad et al.    | |
| 8,842,841 B2   | 9/2014  | Hook et al.       | |
| 9,367,702 B2   | 6/2016  | Erofeev et al.    | |
| 9,432,192 B1 * | 8/2016  | Pogde ............. | H04L 9/0836 |
| 9,455,963 B1 * | 9/2016  | Roth .............. | H04L 63/0464 |
| 9,577,995 B1 * | 2/2017  | Kuzmenko ......... | H04L 63/061 |

(Continued)

OTHER PUBLICATIONS

Bennani et al.; "Toward Cloud-Based Key Management for Outsourced Databases"; COMPSAC Workshops. 2010.

(Continued)

*Primary Examiner* — Jason Chiang
(74) *Attorney, Agent, or Firm* — Peter Edwards

(57) ABSTRACT

Disclosed aspects relate to local encryption of a set of replicated data in a shared pool of configurable computing resources which has a set of member nodes. A first local encryption key for the first node of the set of member nodes may be determined. The first local encryption key for the first node of the set of member nodes may be generated. A second local encryption key for the second node of the set of member nodes may be determined. The second local encryption key may differ from the first local encryption key. The second local encryption key for the second node of the set of member nodes may be generated. A temporary key for utilization by both the first and second nodes may be generated. The set of replicated data may be updated using the first local encryption key, the temporary key, and the second local encryption key.

20 Claims, 9 Drawing Sheets

(56) References Cited

U.S. PATENT DOCUMENTS

| | | | |
|---|---|---|---|
| 2009/0323963 A1* | 12/2009 | McTeer | H04L 9/0894 |
| | | | 380/277 |
| 2012/0300940 A1* | 11/2012 | Sabin | H04L 9/0891 |
| | | | 380/282 |
| 2014/0281514 A1* | 9/2014 | Erofeev | G06F 21/6218 |
| | | | 713/165 |
| 2014/0358852 A1* | 12/2014 | Yurchenko | G06F 16/275 |
| | | | 707/610 |
| 2015/0172260 A1 | 6/2015 | Brenner | |
| 2016/0078245 A1* | 3/2016 | Amarendran | G06F 16/164 |
| | | | 713/193 |
| 2016/0239556 A1* | 8/2016 | Oh | H04L 67/1095 |
| 2016/0269364 A1 | 9/2016 | White et al. | |
| 2017/0041296 A1* | 2/2017 | Ford | G06F 16/951 |
| 2017/0169059 A1* | 6/2017 | Horowitz | G06F 16/211 |
| 2017/0207956 A1* | 7/2017 | Cabral | H04W 4/50 |
| 2017/0359314 A1* | 12/2017 | Mathias | H04L 63/0428 |
| 2018/0012032 A1* | 1/2018 | Radich | H04L 9/14 |
| 2018/0053018 A1* | 2/2018 | Baskaran | G06F 21/62 |

OTHER PUBLICATIONS

Sun, Lei; "Role-based secure group communication and data sharing system"; Simon Fraser University; 2011.

Mell, Peter, et al., The NIST Definition of Cloud Computing, National Institute of Standards and Technology, Oct. 7, 2009, Version 15, NIST, Gaithersburg, MD, US.

Terr, David; "Diffie-Hellman Protocol"; From MathWorld—A Wolfram Web Resource, created by Eric W. Weisstein; <http://mathworld.wolfram.com/Diffie-HellmanProtocol.html>.

OpenSSL; "Diffie Hellman"; OpenSSL; <https://wiki.openssl.org/index.php/Diffie_Hellman>.

Young, Bill; "Foundations of Computer Security Lecture 52: Diffie-Hellman Key Exchange"; <https://www.cs.utexas.edu/~byoung/cs361/lecture52.pdf>.

* cited by examiner

800

Read Entry 810

Header is unencrypted and contains the location of the keystore file

Encrypted data is data that is encrypted with the local key

Change Entry 820

Header is unencrypted and contains the location of the keystore file

Broadcast Entry 830

A change entry where the entire entry is encrypted with a temporary shared key

US 10,594,481 B2

REPLICATED ENCRYPTED DATA MANAGEMENT

BACKGROUND

This disclosure relates generally to computer systems and, more particularly, relates to local encryption of a set of replicated data in a shared pool of configurable computing resources which has a set of member nodes. The amount of replicated data that needs to be managed using encryption is increasing. Encryption of a set of replicated data may be desired to be performed as efficiently as possible. As data needing to be managed increases, the need for encryption of the set of replicated data may also increase.

SUMMARY

Aspects of the disclosure relate to local encryption of a set of replicated data in a shared pool of configurable computing resources which has a set of member nodes. One or more nodes of the set of member nodes may independently generate a local encryption key to encrypt a set of replicated data. Different sets of replicated data may be encrypted using different local encryption keys. When an update to the set of replicated data occurs, a temporary encryption key may be used to securely transfer the set of replicated data from one node to another within the set of member nodes. Local encryption keys for each node may be updated independently and at different times to maintain continuously availability of the set of replicated data. Local encryption keys may be independently maintained by each node without being shared with other nodes.

Disclosed aspects relate to local encryption of a set of replicated data in a shared pool of configurable computing resources which has a set of member nodes. A first local encryption key for the first node of the set of member nodes may be determined. The first local encryption key for the first node of the set of member nodes may be generated. A second local encryption key for the second node of the set of member nodes may be determined. The second local encryption key may differ from the first local encryption key. The second local encryption key for the second node of the set of member nodes may be generated. A temporary key for utilization by both the first and second nodes may be generated. The set of replicated data may be updated using the first local encryption key, the temporary key, and the second local encryption key. Disclosed aspects are applicable to n member nodes.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
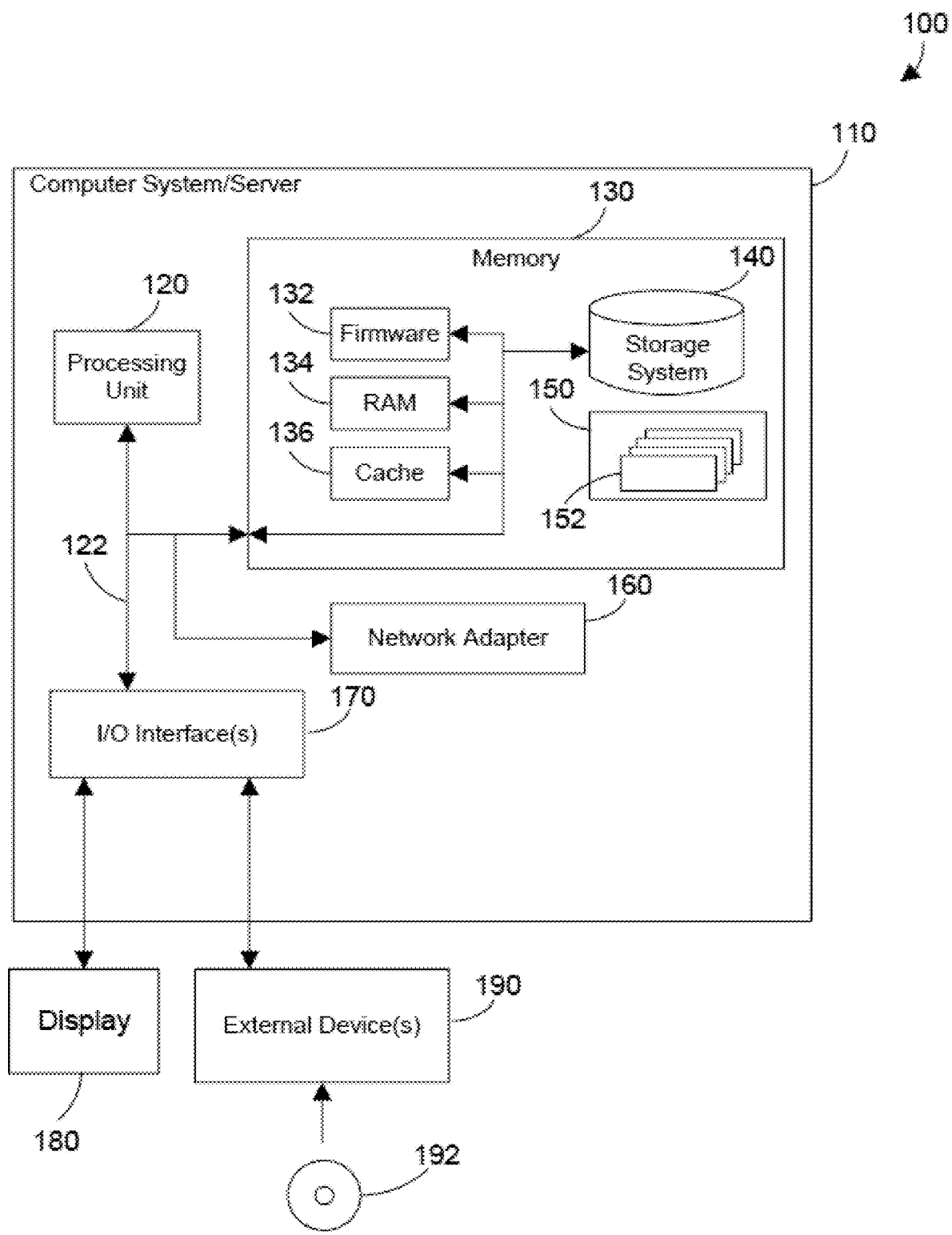
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to local encryption of a set of replicated data in a shared pool of configurable computing resources which has a set of member nodes (e.g., cluster). One or more nodes of the set of member nodes may independently generate a local encryption key to encrypt a set of replicated data. Different sets of replicated data may be encrypted using different local encryption keys. When an update to the set of replicated data occurs, a temporary encryption key may be used to securely transfer the set of replicated data from one node to another within the set of member nodes (e.g., and subsequently re-encrypted using the local encryption key for the receiving node). Local encryption keys for each node may be updated independently (e.g., all nodes of the set of member nodes do not need to be active/available in order to update) and at different times to maintain continuously availability of the set of replicated data (e.g., at least one node of the set of member nodes may remain available). Local encryption keys may be independently maintained by each node without being shared with other nodes (e.g., to promote key security and prevent keys from being compromised). Leveraging local encryption keys for nodes in a cluster may be associated with benefits such as data security, data availability, and key management efficiency.

In distributed computing environments, data may be replicated to prevent a single point of failure and encrypted to protect sensitive information. Aspects of the disclosure relate to the recognition that, in some situations, the encryption key used to encrypt data may be compromised (e.g., as the key is shared between member nodes of the environment). Additionally, modification of existing encryption keys may be associated with availability issues with respect to both the modified encryption key (e.g., offline systems may not be updated at the same time) as well as the encrypted data (e.g., data may be unavailable during re-encryption). Accordingly, aspects of the disclosure relate to utilizing a local encryption key generated and maintained independently for each node in a cluster. When an update to a set of replicated data is required, a new temporary key may be created to encrypt and send the set of replicated data to other nodes in the cluster. Usage of local keys for each node in a cluster may reduce key sharing between nodes (e.g., promoting encryption key security), facilitate data availability (e.g., the set of replicated data may remain available on at least one node during re-encryption), and streamline encryption key update flexibility (e.g., encryption keys may be updated independently).

Aspects of the disclosure include a method, system, and computer program product for local encryption of a set of replicated data in a shared pool of configurable computing resources which has a set of member nodes. A first local encryption key for the first node of the set of member nodes may be determined. The first local encryption key for the first node of the set of member nodes may be generated. A second local encryption key for the second node of the set of member nodes may be determined. The second local encryption key may differ from the first local encryption key. The second local encryption key for the second node of the set of member nodes may be generated. A temporary key for utilization by both the first and second nodes may be generated. The set of replicated data may be updated using the first local encryption key, the temporary key, and the second local encryption key. Disclosed aspects are applicable to n member nodes.

In embodiments, the first copy of the set of replicated data may be decrypted by the first node of the set of member nodes using the first local encryption key, the set of replicated data may be modified on the first node of the set of member nodes to establish a package which has the set of modified replicated data, the package which has the set of modified replicated data may be encrypted by the first node using the temporary key, the package which has the set of modified replicated data may be transferred from the first node to the second node, and the package may be decrypted by the second node using the temporary key. In embodiments, the set of modified replicated data may be saved as the first copy of the set of replicated data on the first node of the set of member nodes, and saved as a second copy of the set of replicated data on the second node of the set of member nodes. In embodiments, the first copy of the set of replicated data may be encrypted on the first node of the set of member nodes by the first node of the set of member nodes using the first local encryption key, and the second copy of the set of replicated data may be encrypted on the second node of the set of member nodes by the second node of the set of member nodes using the second local encryption key.

Aspects may relate to simplified key management. For example, a file to be replicated may be desired to be encrypted. A user need do no additional key management (e.g., copying a symmetric key to all nodes or setting up public/private key pairs) to replicate the file and have it encrypted among the member nodes. In embodiments, different files on the same node could use different keys. Altogether, aspects of the disclosure can have performance or efficiency benefits. Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
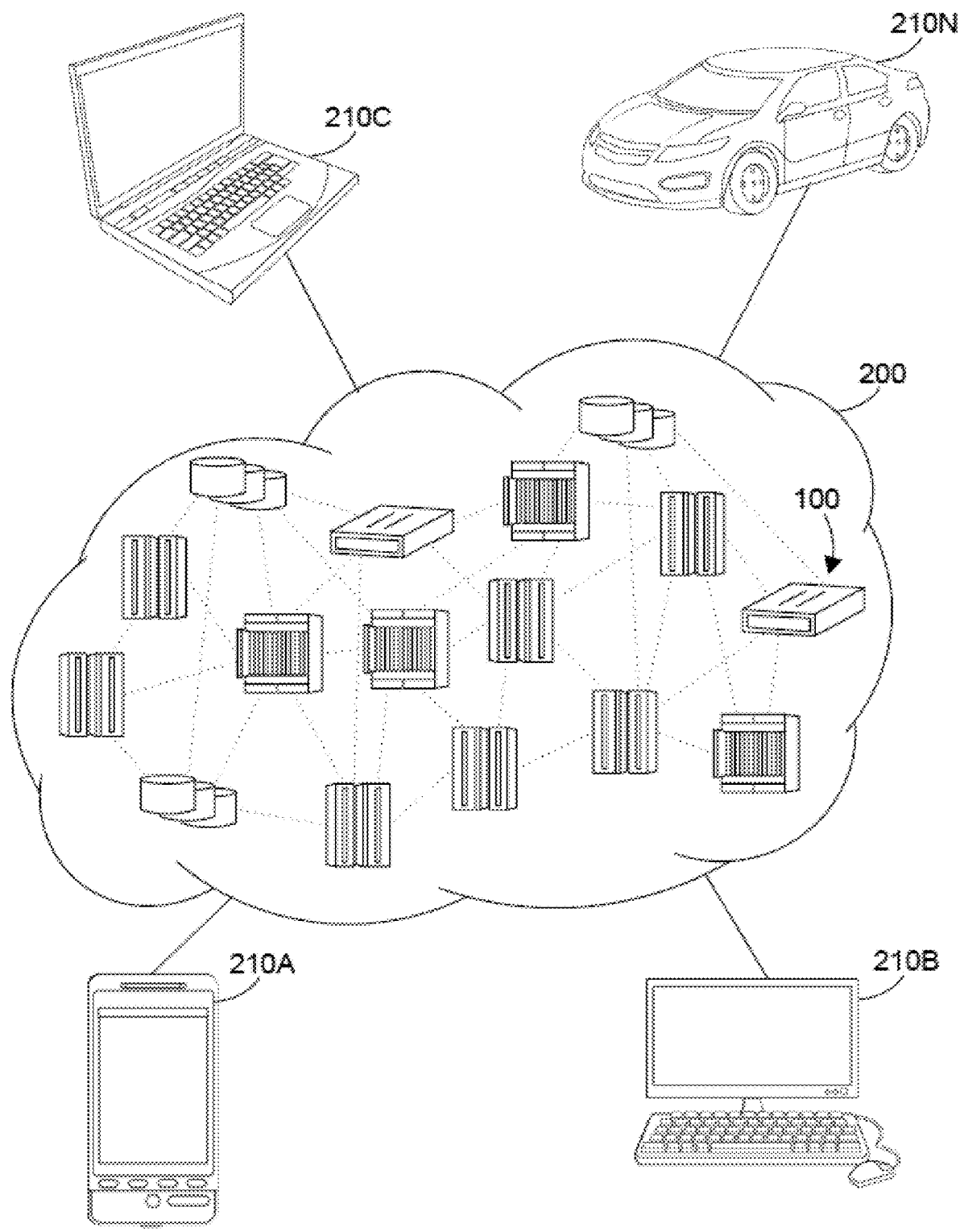
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
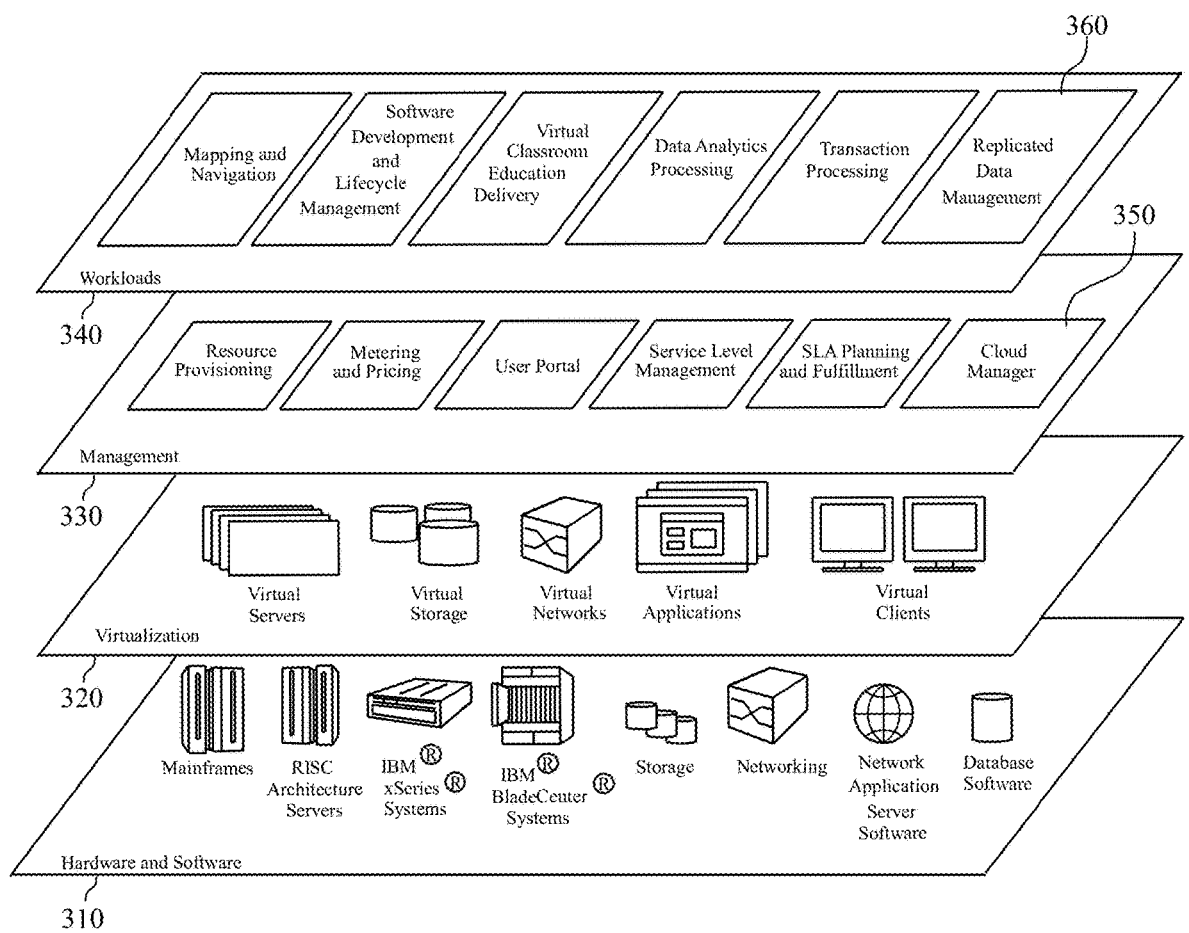
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and replicated data management 360, which may be utilized as discussed in more detail below.

Figure 4:
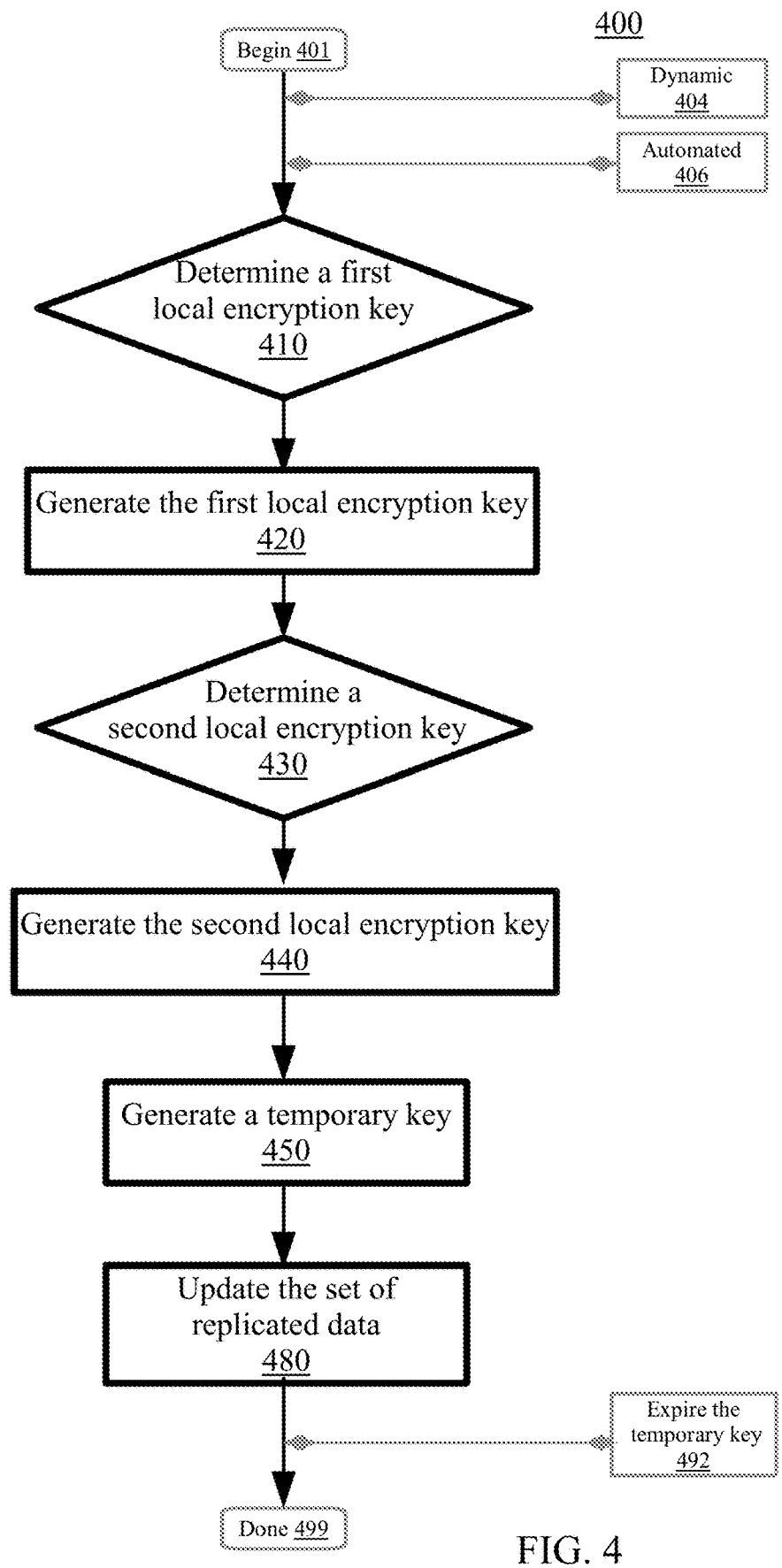
FIG. 4 is a flowchart illustrating a method for local encryption of a set of replicated data in a shared pool of configurable computing resources which has a set of member nodes, according to embodiments.

FIG. 4 is a flowchart illustrating a method 400 for local encryption of a set of replicated data in a shared pool of configurable computing resources which has a set of member nodes, according to embodiments. Aspects of the method 400 relate to determining and generating a local encryption key for one or more nodes of a set of member nodes, and using the local encryption keys to update a set of replicated data. The set of member nodes may include a plurality of physical or virtual communication points in the shared pool of configurable computing resources (e.g., distributed computing network). The set of member nodes may include physical devices (e.g., servers, laptop/desktop computers, mobile devices, computer hardware) or virtual devices (e.g., virtual machines, logical partitions, virtualized hardware). In embodiments, the set of replicated data may include a collection of information shared between one or more nodes of the set of member nodes. For instance, the set of replicated data may be shared between the set of member nodes using transactional replication, state machine replication, virtual synchrony, or one or more other replication models. In certain embodiments, the set of replicated data may include confidential or sensitive information (e.g., classified business materials, medical records, financial transactions), such that it may be desirable to encrypt the set of replicated data. For instance, the set of replicated data may be encrypted using symmetric key techniques, private key techniques, public key techniques, or the like. Accordingly, aspects of method 400 relate to using a unique local encryption key for each node of the set of member nodes to facilitate data security and encryption key management. The method 400 may begin at block 401.

In embodiments, the determinings, the generatings, the updating, and the other steps described herein may each be executed in a dynamic fashion at block 404. The steps described herein may be executed in a dynamic fashion to streamline local encryption of the set of replicated data in the shared pool of configurable computing resources which has the set of member nodes. For instance, the determinings, the generatings, the updating, and the other steps described herein may occur in real-time, ongoing, or on-the-fly. As an example, one or more steps described herein may be performed in an ongoing fashion (e.g., local encryption keys may be continuously determined, generated, and used to update sets of replicated data) in order to streamline (e.g., facilitate, promote, enchance) local encryption of a set of replicated data in a shared pool of configurable computing resources which has the set of member nodes.

In embodiments, the determinings, the generatings, the updating, and the other steps described herein may each be executed in an automated fashion at block 406. The steps described herein may be executed in an automated fashion without user intervention. In embodiments, the determinings, the generatings, the updating, and the other steps described herein may be carried out by a local encryption management module maintained in a persistent storage device of a local computing device (e.g., network node). In embodiments, the determinings, the generatings, the updating, and the other steps described herein may be carried out by an external local encryption management module hosted by a remote computing device or server (e.g., server accessible via subscription, usage-based, or other service model). As such, aspects of local encryption management may be performed using automated computing machinery without manual action. Other methods of performing the steps described herein are also possible.

At block 410, a first local encryption key for the first node of the set of member nodes may be determined. The first local encryption key may be determined with respect to a first copy of the set of replicated data. The first node of the set of member nodes may perform the determining. Generally, determining can include formulating, calculating, resolving, computing, identifying, or otherwise ascertaining the first local encryption key for the first node of the set of member nodes. The first local encryption key may include a string of numbers, letters, characters, or bits used to encrypt and decrypt (e.g., encode and decode) sets of data. The first local encryption key may correspond to (e.g., be paired, coupled, linked, or uniquely associated with) the first node of the set of member nodes. As an example, the first local encryption key may include a string of bits such as "3048 0241 00C9 18FA CF8D." In embodiments, the first local encryption key may be used to encrypt a first copy of the set of replicated data. The first copy of the set of replicated data may include a duplicate or reproduction of the set of replicated data that is maintained on the first node of the set of member nodes. As an example, the first copy of the set of replicated data may include a database file stored on the first node that indicates financial transactions for a group of user accounts. In embodiments, determining the first local encryption key may include ascertaining an encryption key for the first node of the set of member nodes based on a unique hardware identifier (e.g., media access control address, hardware configuration element) for the first node. In embodiments, the first local encryption key may be generated for the first node independent from other nodes in the set of member nodes (e.g., at a different time, without communicating with). Other methods of determining the first local encryption key for the first node of the set of member nodes are also possible.

At block 420, the first local encryption key for the first node of the set of member nodes may be generated. The first local encryption key may be generated with respect to the first copy of the set of replicated data by the first node of the set of member nodes. Generally, generating can include producing, computing, formulating, calculating, assembling, structuring, assigning, establishing, or otherwise creating the first local encryption key for the first node of the set of member nodes. In embodiments, generating the first local encryption key may include utilizing an encryption key algorithm (e.g., pseudorandom number generator, passphrase and key derivation-function, symmetric-key algorithm, public/private key algorithm) or hashing function (e.g., tabulation hashing, Zobrist hashing, universal one-way hash, Rabin fingerprint) to compute the first local encryption key and assign it to (e.g., pair it with, couple it with) the first node of the set of member nodes. In embodiments, generating the first local encryption key may include formulating an encryption key that is mathematically related to a hardware characteristic of the first node of the set of member nodes. For example, the encryption key algorithm/hashing function may be configured to parse the hardware configuration of the first node to identify a unique hardware identifier (e.g., media access control address), hardware characteristic (e.g., processor frequency, device model), or other element of the hardware configuration of the first node to use as a seed value (e.g., value to initialize the key generation algorithm) to calculate the first local encryption key. As an example, a first local encryption key of "EB2D EFD5 FD37 89B9 E069" may be generated for the first node of the set of member nodes. As described herein, the first local encryption key may be used to encrypt the first copy of the set of replicated data on the first node. Other methods of generating the first local encryption key for the first node of the set of member nodes are also possible.

At block 430, a second local encryption key for the second node of the set of member nodes may be determined. The second local encryption key may be determined with respect to a second copy of the set of replicated data. The second local encryption key may differ from the first local encryption key. The second node of the set of member nodes may perform the determining. Generally, determining can include formulating, calculating, resolving, computing, identifying, or otherwise ascertaining the second local encryption key for the second node of the set of member nodes. The second local encryption key may include a string of numbers, letters, characters, or bits used to encrypt and decrypt (e.g., scramble and unscramble) sets of data. The second local encryption key may correspond to (e.g., be paired, coupled, linked, or uniquely associated with) the second node of the set of member nodes. As an example, the second local encryption key may include a string of bits such as "EA97 FC20 5E35 F577." In embodiments, the second local encryption key may be used to encrypt a second copy of the set of replicated data. The second copy of the set of replicated data may include a duplicate or reproduction of the set of replicated data that is maintained on the second node of the set of member nodes. As an example, the second copy of the set of replicated data may include a file indicating the medical history for a hospital patient. In embodiments, determining the second local encryption key may include ascertaining an encryption key for the second node of the set of member nodes based on a unique hardware identifier (e.g., media access control address, hardware configuration element) for the second node. In embodiments, the second local encryption key may be generated for the second node independent from other nodes in the set of member nodes (e.g., at a different time, without communicating with). In embodiments, the second local encryption key may differ from the first local encryption key (e.g., not be identical to, not overlap with the first local encryption key). As such, in certain embodiments, each respective node of the set of member nodes may have its own unique local encryption key (e.g., that is not shared/made known to other nodes). Other methods of determining the second local encryption key for the second node of the set of member nodes are also possible.

At block 440, the second local encryption key for the second node of the set of member nodes may be generated.

The second local encryption key may be generated with respect to the second copy of the set of replicated data by the second node of the set of member nodes. Generally, generating can include producing, computing, formulating, calculating, assembling, structuring, assigning, establishing, or otherwise creating the second local encryption key for the second node of the set of member nodes. In embodiments, generating the second local encryption key may include utilizing an encryption key algorithm (e.g., pseudorandom number generator, passphrase and key derivation-function, symmetric-key algorithm, public/private key algorithm) or hashing function (e.g., tabulation hashing, Zobrist hashing, universal one-way hash, Rabin fingerprint) to compute the second local encryption key and assign it to (e.g., pair it with, couple it with) the second node of the set of member nodes. In embodiments, generating the second local encryption key may include formulating an encryption key that is mathematically related to a hardware characteristic of the second node of the set of member nodes. For example, the encryption key algorithm/hashing function may be configured to parse the hardware configuration of the second node to identify a unique hardware identifier (e.g., media access control address), hardware characteristic (e.g., processor frequency, device model), or other element of the hardware configuration of the second node to use as a seed (e.g., value to initialize the key generation algorithm) to calculate the second local encryption key. As an example, a second local encryption key of "EE31 C4FB C6E4 4811" may be generated for the second node of the set of member nodes. As described herein, the second local encryption key may be used to encrypt the second copy of the set of replicated data on the second node. Other methods of generating the second local encryption key for the second node of the set of member nodes are also possible.

At block 450, a temporary key for utilization by both the first and second nodes of the set of member nodes may be generated. The generating may occur to modify the set of replicated data. Generally, generating can include producing, computing, formulating, calculating, assembling, structuring, assigning, establishing, or otherwise creating the temporary key for utilization by both the first and second nodes of the set of member nodes to modify the set of replicated data. The temporary key may include a transitory or provisional encryption key that may be valid for encrypting a set of data (e.g., the first or second copy of the set of replicated data) based on one or more pre-determined parameters (e.g., conditions). For instance, the temporary key may be valid for a pre-determined usage (e.g., transfer of a data set from one node to another), a specified time period (e.g., 1 hour, 6 hours, 24 hours), a number of usages (e.g., 1 time use, 3 time use) until a triggering event is detected (e.g., the encrypted data is received and decrypted by an intended recipient), or the like. In embodiments, as described herein, the temporary key may be used to encrypt one or more copies of the set of replicated data for transmission between nodes of the set of member nodes (e.g., while the first and second local encryption keys are used to encrypt data on the first and second nodes, respectively). In embodiments, generating may include using a Diffie-Hellman key exchange protocol to calculate the temporary key for utilization by both the first and second nodes of the set of member nodes. As an example, the Diffie-Hellman key exchange protocol may be used to generate a temporary key of "de9b707d4c5a4633" for utilization by both the first and second nodes of the set of member nodes. Other methods of generating the temporary key are also possible.

At block 480, the set of replicated data may be updated. The set of replicated data may be updated using the first local encryption key, the temporary key, and the second local encryption key. The updating may occur on the first and second nodes of the set of member nodes. Generally, updating can include revising, editing, amending, adjusting, altering, modifying, or otherwise changing the set of replicated data. In embodiments, updating the set of replicated data may include adding new data (e.g., new data entries/records) to the set of replicated data, changing existing data entries/records of the set of replicated data, or deleting entries/records of the set of replicated data. As described herein, aspects of the disclosure relate to the recognition that in some situations, modifications with respect to a copy of the set of replicated data on a single node of the set of member nodes may be associated with transferring the modified set of replicated data to other nodes of the set of member nodes to facilitate data synchronization (e.g., so that each copy of the set of replicated data is identical among the set of member nodes). Accordingly, in embodiments, the first local encryption key, the temporary key, and the second local encryption key may be used to facilitate maintenance and transfer of the set of replicated data from one node to another within the set of nodes. In embodiments, updating may include using the first local encryption key to decrypt the first copy of the set of replicated data on the first node of the set of member nodes, performing a modification (e.g., adding data, editing data, removing data) on the first copy of the set of replicated data, encrypting the modified replicated data using the temporary key, transmitting the modified replicated data to the second node, decrypting the modified replicated data by the second node using the temporary key, and re-encrypting the set of modified replicated data using the second local encryption key for the second node. Other methods of updating the set of replicated data using the first local encryption key, the temporary key, and the second local encryption key are also possible.

In embodiments, the temporary key may expire at block 492. The temporary key may expire in response to using the temporary key to modify the set of replicated data. As described herein, aspects of the disclosure relate to utilizing the temporary key for a particular task/function or for a predetermined period of time after which it may expire (e.g., cease to be functional). Generally, expiring can include discarding, canceling, eliminating, abandoning, terminating, removing, or otherwise disposing of the temporary key. In embodiments, the temporary key may be configured for one-time usage, such that it may be used for one encryption operation and one decryption operation before becoming invalid. As an example, the temporary key may be used by the first node to encrypt a set of replicated data prior to transferring it to a second node, and the second node may use the same temporary key to decrypt the set of replicated data once it is received. After the decryption operation, the temporary key may be invalidated. In embodiments, expiring the temporary key may include registering the temporary key in a temporary key log along with one or more expiration conditions under which the temporary key may expire (e.g., number of uses, length of time, triggering event). In response to detecting that the expiration conditions for a particular temporary key have been achieved, the entry corresponding to the temporary key in the temporary key log may be marked with an expiration tag indicating that the particular temporary key is no longer valid for use. Other methods of expiring the temporary key are also possible.

Consider the following example. A set of replicated data maintained on a set of member nodes may include information regarding unreleased product designs. A copy of the set of replicated data may be stored on multiple member nodes of the set of member nodes. As described herein, each copy of the set of replicated data may be encrypted using a local encryption key that is unique for each respective node of the set of member nodes. In embodiments, a first node of the set of member nodes may determine and generate a first local encryption key of "E2CD CB02 0301 0001" for a first copy of the set of replicated data, and a second node of the set of member nodes may determine and generate a second local encryption key of "D673 CA2B 4003 C266" for a second copy of the set of replicated data. Accordingly, the first copy of the set of replicated data may be encrypted using the first local encryption key and maintained on the first node, and the second copy of the set of replicated data may be encrypted using the second local encryption key and maintained on the second node. In certain embodiments, a user, computer application, or other operation may indicate (e.g., using a graphical user interface) a request to make a modification with respect to the first copy of the set of replicated data. The first copy of the set of replicated data may be decrypted using the first local encryption key to present the set of replicated data as clear data (e.g., unencrypted, plain information). Modifications (e.g., changes to the unreleased product designs) may be made and saved to the set of replicated data (e.g., re-encrypted with the first key). In embodiments, in response to detecting a modification with respect to the first copy of the set of replicated data, it may be necessary to synchronize the changes with other copies of the set of replicated data stored on other nodes of the set of member nodes. As such, a temporary key of "C744 2654 C0DD 2881" may be generated (e.g., using a Diffie-Hellman algorithm) and used to encrypt the first copy of the set of replicated data (e.g., after being decrypted with the first key), and the first copy of the set of replicated data may be transferred to one or more other nodes of the set of member nodes. As an example, the first copy of the set of replicated data may be transferred to the second node of the set of member nodes. In embodiments, the second node may use the temporary key to decrypt the modified copy of the set of replicated data, and subsequently use the second local encryption key of "D673 CA2B 4003 C266" to re-encrypt and store the modified copy of the set of replicated data on the second node. Other methods of local encryption of a set of replicated data are also possible.

Method 400 concludes at block 499. Aspects of method 400 may provide performance or efficiency benefits related to local encryption of a set of replicated data in a shared pool of configurable computing resources which has a set of member nodes. As an example, local encryption keys may be privately maintained on each respective node of the set of member nodes, such that sharing and transferring of encryption keys between nodes may be avoided (e.g., preventing encryption keys from being compromised—copying an encrypted file to another member node may not aid in decrypting the file since each node uses a different key; thus, a compromised member node could not decrypt files copied to it from other member nodes). Aspects may save resources such as bandwidth, processing, or memory.

Figure 5:
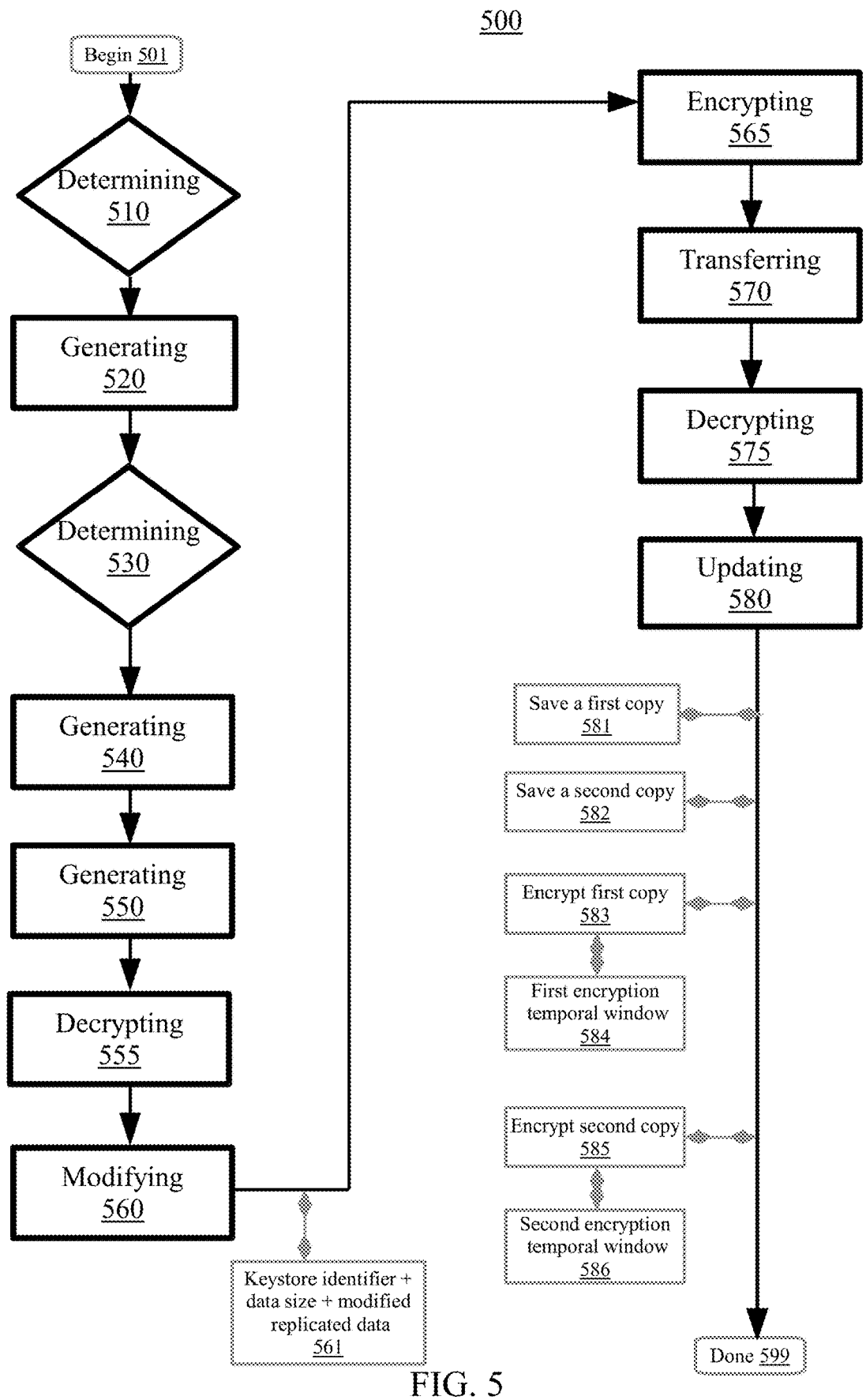
FIG. 5 is a flowchart illustrating a method for local encryption of a set of replicated data in a shared pool of configurable computing resources which has a set of member nodes, according to embodiments.

FIG. 5 is a flowchart illustrating a method 500 for local encryption of a set of replicated data in a shared pool of configurable computing resources which has a set of member nodes, according to embodiments. Aspects of the method 500 relate to using a first local encryption key, a temporary key, and a second local encryption key to facilitate secure maintenance and transfer of a set of replicated data. Aspects of method 500 may be similar or the same as aspects of 400, and aspects may be utilized interchangeably. Altogether, leveraging local encryption keys for nodes in a cluster may be associated with benefits such as data security, data availability, and key management efficiency. The method 500 may begin at block 501.

At block 510, a first local encryption key for the first node of the set of member nodes may be determined. The first local encryption key may be determined with respect to a first copy of the set of replicated data. The first node of the set of member nodes may perform the determining. At block 520, the first local encryption key for the first node of the set of member nodes may be generated. The first local encryption key may be generated with respect to the first copy of the set of replicated data by the first node of the set of member nodes. At block 530, a second local encryption key for the second node of the set of member nodes may be determined. The second local encryption key may be determined with respect to a second copy of the set of replicated data. The second local encryption key may differ the first local encryption key. The second node of the set of member nodes may perform the determining. At block 540, the second local encryption key for the second node of the set of member nodes may be generated. The second local encryption key may be generated with respect to the second copy of the set of replicated data by the second node of the set of member nodes. At block 550, a temporary key for utilization by both the first and second nodes of the set of member nodes may be generated. The generating may occur to modify the set of replicated data.

At block 555, the first copy of the set of replicated data may be decrypted. The decrypting may occur using the first local encryption key. The decrypting may be performed by the first node of the set of member nodes. As described herein, aspects of the disclosure relate to using the first local encryption key to encrypt the first copy of the set of replicated data for secure storage on the first node of the set of member nodes. Accordingly, in embodiments, the first local encryption key may also be used to decrypt the first copy of the set of replicated data (e.g., to make changes or modifications, prepare data for transmission). Generally, decrypting can include interpreting, decoding, solving, translating, converting, or otherwise deciphering the first copy of the set of replicated data. In embodiments, decrypting may include converting the first copy of the set of replicated data from an encrypted format (e.g., unintelligible cyphertext) to a plaintext format (e.g., unencrypted, intelligible data) using the first local encryption key. In embodiments, decrypting may include initiating a decryption tool and specifying (e.g., entering) the first local encryption key for use to decrypt the first copy of the set of replicated data. In certain embodiments, decrypting may include designating a storage location (e.g., memory address) where the first local encryption key is stored, and subsequently importing the first local encryption key from the designated storage location to decrypt the first copy of the set of replicated data to plaintext. Other methods of decrypting the first copy of the set of replicated data are also possible, for example, using a system-generated key that is stored in hardware protected memory and is never available to any user storage (e.g., so memory scrappers and the like cannot find the key).

At block 560, the set of replicated data on the first node of the set of member nodes may be modified. The set of replicated data may be modified to establish a package which has a set of modified replicated data. Aspects of the disclosure relate to the recognition that, in some situations, a copy of the set of replicated data stored on a particular node of the set of nodes may be edited or modified.

Generally, modifying can include revising, editing, amending, adjusting, altering, or otherwise changing the set of replicated data to establish the package which has the set of modified replicated data. In embodiments, modifying the set of replicated data can include adding additional data (e.g., new data entries/records) to the set of replicated data, changing existing data entries/records of the set of replicated data, or deleting entries/records of the set of replicated data. As an example, for a set of replicated data that includes inventory information for a retail store, modifying the set of replicated data may include editing the inventory information to revise inventory item numbers, add new items or delete items that are no longer carried by the retail store, update prices of existing items, or the like. In embodiments, modifying the set of replicated data may include establishing a package that includes the set of modified replicated data (e.g., the set of replicated data together with any changes or revisions made by the modification operation). The package may include a container, bundle, packet, or other collection of files that make-up the set of modified replicated data and other associated information. As an example, the package may include the set of modified replicated data together with a metadata file that includes information regarding the nature of the set of modified replicated data, when the set of replicated data was modified, the degree of the modifications made to the set of replicated data with respect to a previous version, or the like. Other methods of modifying the set of replicated data to establish the package which has the set of modified replicated data are also possible.

In embodiments, the package may be established at block 561. The package may include a keystore identifier. The keystore identifier may indicate a location of one or more encryption keys for a cryptographic operation (e.g., to allow different keys to be used for different files, such as, for example, different products could use different keys). The package may include a data size. The package may include the set of modified replicated data. Generally, establishing can include instantiating, creating, setting-up, organizing, introducing, providing, assembling, arranging, generating, or otherwise structuring the package to include the keystore identifier, the data size, and the set of modified replicated data. As described herein, the set of modified replicated data may include a set of replicated data that has been edited, revised, adjusted, or otherwise changed with respect to a previous version (e.g., a database, index, or repository to which additional rows/columns have been added). In embodiments, the keystore identifier may include an indication of a virtual location (e.g., memory address, network file path) at which one or more encryption keys are saved. As an example, the keystore identifier may include a network path of "\\Server3\Users\User1\KeystoreRepository\Keys\Key34" that designates where a particular encryption key is located (e.g., such that the key may be accessed and used to decrypt an encrypted file). In embodiments, the keystore identifier may indicate a predetermined identifier for a particular encryption key. For instance, the keystore identifier may include an identifier of "Encryption Key 293" that instructs a node of a specific encryption key (e.g., local encryption key) to use for a particular cryptographic operation. In embodiments, the package may include a data size. The data size may include an indication of the volume, extent, or amount of information included in the set of modified replicated data. For example, the data size may indicate the file size of the set of modified replicated data (e.g., 32 megabytes), the length (e.g., number of words, characters, columns, rows, data cells), or other characteristics of the set of modified replicated data. In embodiments, establishing may include formatting the package to include the keystore identifier, the data size, and the set of modified replicated data. For instance, the package may be partitioned into a header portion configured to maintain the keystore identifier and the data size, and a body portion configured to maintain the set of modified replicated data. Other methods of establishing the package are also possible.

At block 565, the package which has the set of modified replicated data may be encrypted. The encrypting may be performed by the first node using the temporary key. As described herein, aspects of the disclosure relate to encrypting a set of modified replicated data using a temporary key to facilitate secure transmission from one node to another among the set of member nodes Generally, encrypting can include encoding, scrambling, converting, or otherwise enciphering the package which has the set of modified replicated data. In embodiments, encrypting can include converting the package from a plaintext format (e.g., unencrypted, intelligible data) to an encrypted format (e.g., unintelligible cyphertext) using the temporary key. In embodiments, encrypting may include utilizing a Diffie-Hellman key exchange protocol to calculate the temporary key, and subsequently using the calculated temporary key to encrypt the package which has the set of modified replicated data (e.g., together with the data size and the keystore identifier) by the first node. Other methods of encrypting the package by the first node using the temporary key are also possible.

At block 570, the package which has the set of modified replicated data may be transferring. The package may be transferred from the first node to the second node. Generally, transferring can include sending, moving, relocating, directing, relaying, routing, transmitting, or otherwise communicating the package which has the set of modified replicated data from the first node to the second node. In embodiments, transferring may include transmitting the package from the first node to the second node along a communication channel as defined by a communications protocol. For instance, transferring may include designating a destination network address of a target node (e.g., second node, third node), and relaying the package along a network connection (e.g., local area connection, Internet connection) from the source node (e.g., first node, node that maintains the package) to the target node. In embodiments, transferring may include analyzing the package, determining a file communication protocol (e.g., transmission control protocol, user datagram protocol) based on one or more characteristics of the package (e.g., data size, encryption type), and routing the package including the set of modified replicated data to the target node using the file communication protocol. Other methods of transferring the package which has the set of modified replicated data are also possible.

At block 575, the package which has the set of modified replicated data may be decrypted. The modifying may be performed by the second node using the temporary key. As described herein, aspects of the disclosure relate to encrypting the set of modified replicated data for transmission using the temporary key, and subsequently decrypting the package by the target node using the same temporary key. Generally, decrypting can include interpreting, decoding, solving, translating, converting, or otherwise deciphering the package which has the set of modified replicated data. In embodiments, decrypting may include converting the package from an encrypted format (e.g., unintelligible cyphertext) to a plaintext format (e.g., unencrypted, intelligible data) using the temporary key. In embodiments, decrypting may include applying the temporary key (e.g., calculated prior to transmission of the package using a Diffie-Hellman technique) to the package, unwrapping the contents of the package (e.g., the set of modified replicated data, the data size, and the keystore identifier), and deciphering the contents of the package to a plaintext format. As described herein, the temporary key may be discarded (e.g., invalidated) after use to decrypt the package. Other methods of decrypting the package which has the set of modified replicated data are also possible.

At block 580, the set of replicated data may be updated. The set of replicated data may be updated using the first local encryption key, the temporary key, and the second local encryption key. The updating may occur on the first and second nodes of the set of member nodes.

In embodiments, the set of modified replicated data may be saved at block 581. The set of modified replicated data may be saved as the first copy of the set of replicated data on the first node of the set of member nodes. The saving may be performed by the first node of the set of member nodes. As described herein, aspects of the disclosure relate to maintaining a copy (e.g., identical version) of the set of modified replicated data on each node of the set of member nodes. Accordingly, the set of modified replicated data may be saved on the first node of the set of member nodes as the first copy of the set of replicated data. Generally, saving can include keeping, collecting, reserving, caching, logging, recording, or otherwise storing the set of modified replicated data as the first copy of the set of replicated data on the first node of the set of member nodes. In embodiments, saving may include writing the set of modified replicated data to a memory location of the first node. For example, the first copy of the set of replicated data may be written to a volatile memory location such as dynamic random-access memory (RAM) or a cache, or to a non-volatile memory location such as a hard disk drive, solid state drive, network storage device accessible to the first node, or the like. In embodiments, the set of modified replicated data may be saved on the first node in response to completion of a modification operation with respect to the set of replicated data. As an example, a set of modified replicated data including an in-development source code document for a software project may be saved to a solid state drive of the first node of the set of member nodes. Other methods of saving the set of modified replicated data as the first copy of the set of replicated data on the first node of the set of member nodes are also possible.

In embodiments, the set of modified replicated data may be saved at block 582. The set of modified replicated data may be saved as the second copy of the set of replicated data on the second node of the set of member nodes. The saving may be performed by the second node of the set of member nodes. As described herein, aspects of the disclosure relate to maintaining a copy (e.g., identical version) of the set of modified replicated data on each node of the set of member nodes. Accordingly, the set of modified replicated data may be saved on the second node of the set of member nodes as the second copy of the set of replicated data. Generally, saving can include keeping, collecting, reserving, caching, logging, recording, or otherwise storing the set of modified replicated data as the second copy of the set of replicated data on the second node of the set of member nodes. In embodiments, saving may include writing the set of modified replicated data to a memory location of the second node. For example, the second copy of the set of replicated data may be written to a volatile memory location such as dynamic random-access memory (RAM) or a cache, or to a non-volatile memory location such as a hard disk drive, solid state drive, network storage device accessible to the second node, or the like. In embodiments, the set of modified replicated data may be saved on the second node in response to receiving and decrypting the package from the first node. As an example, a set of modified replicated data including a revised cost estimate for a construction project may be saved to a hard disk drive of the second node. Other methods of saving the set of modified replicated data as the second copy of the set of replicated data on the second node of the set of member nodes are also possible.

In embodiments, the first copy of the set of replicated data may be encrypted at block 583. The first copy may be encrypted using the first local encryption key. The first copy may be encrypted on the first node of the set of member nodes by the first node of the set of member nodes. As described herein, aspects of the disclosure relate to independently encrypting each copy of the set of replicated data using a local encryption key for a particular node of the set of member nodes, respectively. Accordingly, the first copy of the set of replicated data may be encrypted on the first node using the first local encryption key. Generally, encrypting can include can include encoding, scrambling, converting, or otherwise enciphering the first copy of the set of replicated data using the first local encryption key. In embodiments, encrypting the first copy of the set of replicated data may include converting the first copy of the set of replicated data from a plaintext format to an encrypted format using the first local encryption key. As an example, encrypting may include utilizing an encryption algorithm to import the first local encryption key (e.g., from a designated keystore location) and subsequently encode the first copy of the set of replicated data as cyphertext based on the first local encryption key. In embodiments, encrypting the first copy of the set of replicated data may be performed in response to saving the set of modified replicated data to the first node. Other methods of encrypting the first copy of the set of replicated data using the first local encryption key are also possible.

In embodiments, the first copy of the set of replicated data may be encrypted at block 584. The first copy may be encrypted in a first encryption temporal window. The first copy may be encrypted on the first node of the set of member nodes by the first node of the set of member nodes. Aspects of the disclosure relate to encrypting (e.g., re-encrypting) each copy of the set of replicated data at a different time to maintain continuous availability of the set of replicated data (e.g., so that at least one copy of the set of replicated data is available for access at all times). Generally, encrypting can include encoding, scrambling, converting, or otherwise enciphering the first copy of the set of replicated data in the first encryption temporal window. The first encryption temporal window may include a time frame, period, duration, or span during which encryption of the first copy of the set of replicated data occurs. As examples, the first encryption temporal window may include a designated time frame (e.g., 4:00-4:30 PM), a relative order with respect to other nodes of the set of member nodes (e.g., 3rd in line), a point in time based on a triggering event (e.g., after encryption completes on an 11th node), or the like. In embodiments, encrypting the first copy of the set of replicated data may include scheduling a first encryption operation for the first node for a particular time period. For instance, the first encryption operation for the first copy of the set of replicated data may be scheduled for a time period subsequent to the second copy of the set of replicated data being saved on the second node. As an example, encrypting the first copy of the set of replicated data may include receiving a notification from the second node indicating that the package (e.g., including the set of modified replicated data) has been delivered and saved on the second node, and subsequently initiating encryption of the first copy of the set of replicated data in response to reception of the notification (e.g., such that the set of modified replicated data is available on the second node before the encryption operation is initiated on the first node). Other methods of encrypting the first copy of the set of replicated data in a first encryption temporal window are also possible. For instance, in various embodiments, if a single key is used, the nodes would re-encrypt at the same time, making the data unavailable for the duration of the re-encryption.

In embodiments, the second copy of the set of replicated data may be encrypted at block 585. The second copy may be encrypted using the second local encryption key. The second copy may be encrypted on the second node of the set of member nodes by the second node of the set of member nodes. As described herein, aspects of the disclosure relate to independently encrypting each copy of the set of replicated data using a local encryption key for a particular node of the set of member nodes, respectively. Accordingly, the second copy of the set of replicated data may be encrypted on the second node using the second local encryption key. Generally, encrypting can include can include encoding, scrambling, converting, or otherwise enciphering the second copy of the set of replicated data using the second local encryption key. In embodiments, encrypting the second copy of the set of replicated data may include converting the second copy of the set of replicated data from a plaintext format to an encrypted format using the second local encryption key. For instance, encrypting may include utilizing an encryption algorithm to import the second local encryption key (e.g., from a designated keystore location) and subsequently encoding the second copy of the set of replicated data as cyphertext based on the second local encryption key. As an example, encrypting may include parsing the package including the set of modified replicated data, reading the keystore identifier to identify the location of a designated encryption key (e.g., the second local encryption key), and subsequently using the designated encryption key indicated by the keystore identifier to encrypt the second set of modified replicated data on the second node. In embodiments, encrypting the second copy of the set of replicated data may be performed in response to saving the set of modified replicated data to the second node. Other methods of encrypting the second copy of the set of replicated data using the second local encryption key are also possible.

In embodiments, the second copy of the set of replicated data may be encrypted at block 586. The second copy may be encrypted using the second local encryption key in a second encryption temporal window. The second encryption temporal window may differ from the first encryption temporal window. The second copy may be encrypted on the second node of the set of member nodes by the second node of the set of member nodes. Aspects of the disclosure relate to encrypting (e.g., re-encrypting) each copy of the set of replicated data at a different time to maintain continuous availability of the set of replicated data (e.g., so that at least one copy of the set of replicated data is available for access at all times). Generally, encrypting can include encoding, scrambling, converting, or otherwise enciphering the second copy of the set of replicated data in the second encryption temporal window. As described herein, the second encryption temporal window may include a time frame, period, duration, or span during which encryption of the second copy of the set of replicated data occurs. As examples, the second encryption temporal window may include a designated time frame (e.g., 11:15 AM-12:15 PM), a relative order with respect to other nodes of the set of member nodes (e.g., 5th in line), a point in time based on a triggering event (e.g., after encryption completes on a first node), or the like. In embodiments, the second encryption temporal window may differ from the first encryption temporal window (e.g., the first and second encryption temporal windows may not overlap). In embodiments, encrypting the second copy of the set of replicated data may include scheduling a second encryption operation for the second node for a particular time period. For instance, the second encryption operation for the second copy of the set of replicated data may be scheduled for a time period subsequent to (e.g., in response to) another copy of the set of replicated data completing an encryption operation on another node of the set of member nodes (e.g., such that a copy of the set of replicated data is available on at least one other node of the set of member nodes). In embodiments, encrypting the second copy of the set of replicated data in the second encryption temporal window may include using a job scheduler to generate a staggered encryption timeline for the set of member nodes.

Consider the following example. A compute node cluster may include a set of 12 member nodes. In response to a first copy of the set of replicated data being modified on a first node of the set of member nodes, the first set of replicated data may be encrypted using a temporary encryption key and simultaneously transferred to each of the other 11 nodes of the set of member nodes. Accordingly, a job scheduler may generate a staggered encryption timeline for the set of member nodes such that the first node is configured to encrypt the first copy of the set of replicated data (e.g., using a first local encryption key) in a first encryption temporal window of "7:30-7:45 PM," the second node is configured to encrypt a second copy of the set of replicated data (e.g., using a second local encryption key) in a second encryption temporal window of "7:50-8:05 PM," the third node is configured to encrypt the third copy of the set of replicated data (e.g., using a third local encryption key) in a third encryption temporal window of "8:10-8:25 PM," and so forth, such that each node of the set of member nodes has a non-overlapping encryption temporal window of 15 minutes that begins 5 minutes after the completion of an encryption temporal window for the previous node. In embodiments, encrypting may include configuring each node of the set of member nodes to take turns encrypting their own copies of the set of replicated data (e.g., starting with the first node) based on a predefined node encryption sequence defining an encryption order for the set of member nodes, and provide a notification to the next node in the predefined node encryption sequence when its encryption option has completed (e.g., prompting the next node to begin its encryption temporal window and encrypt its copy of the set of replicated data). Other methods of encrypting the second copy of the set of replicated data in a second encryption temporal window are also possible. For instance, the temporal windows may be used when re-encrypting. A security policy may be that every 3 months encryption keys must change. The temporal window would be 3 months using one or more ways to do the re-encryption. Such methodologies can include, for example, node 1 re-encrypts and then sends a message to the next node in sequence, or each node has a non-overlapping window.

Method 500 concludes at block 599. Aspects of method 500 may provide performance or efficiency benefits related to local encryption of a set of replicated data in a shared pool of configurable computing resources which has a set of member nodes. Aspects may save resources such as bandwidth, processing, or memory.

Figure 6:
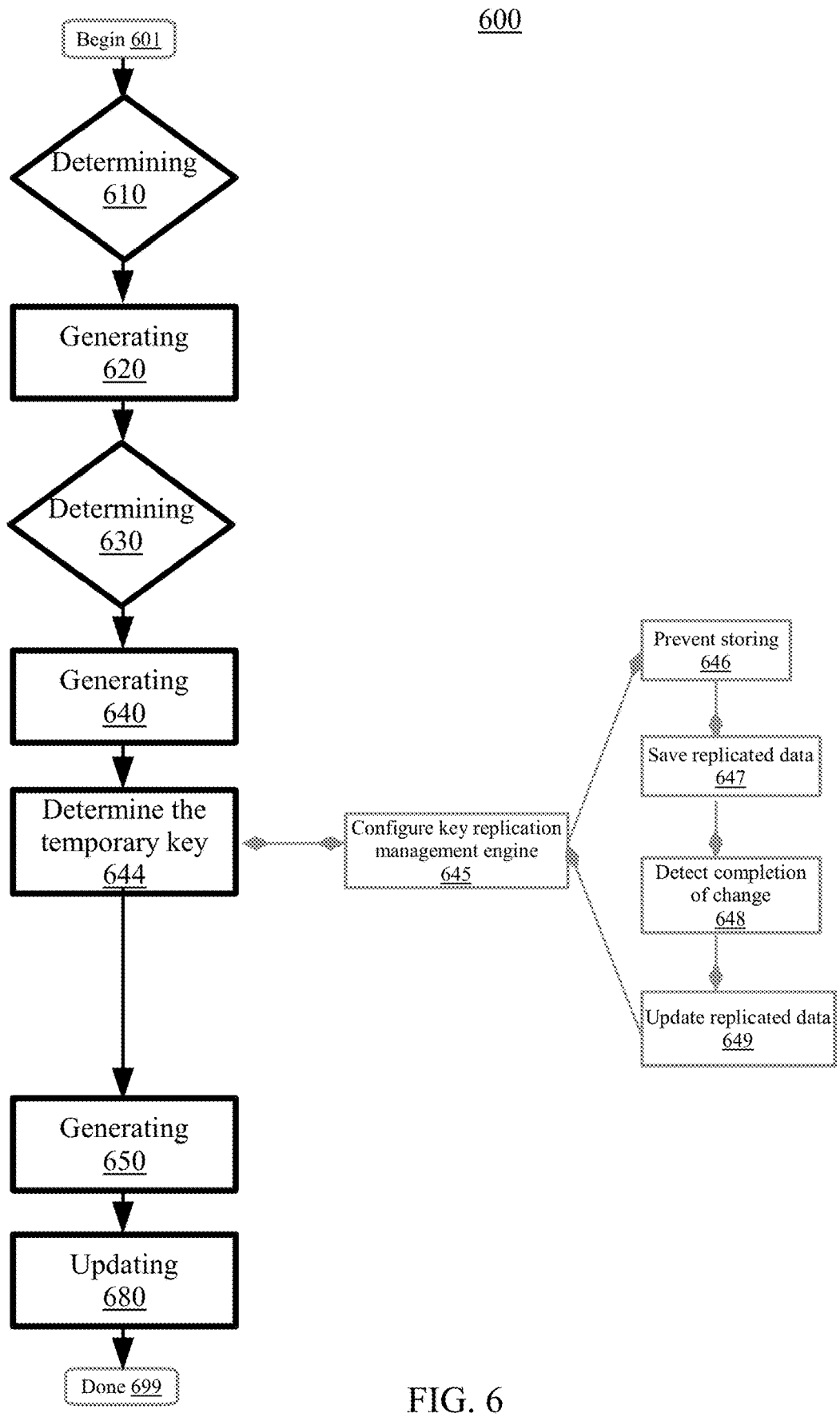
FIG. 6 is a flowchart illustrating a method for local encryption of a set of replicated data in a shared pool of configurable computing resources which has a set of member nodes, according to embodiments.

FIG. 6 is a flowchart illustrating a method 600 for local encryption of a set of replicated data in a shared pool of configurable computing resources which has a set of member nodes, according to embodiments. Aspects of method 600 relate to using a key exchange technique by a key replication management engine to manage determination and usage of a temporary key. Aspects of method 600 may be similar or the same as aspects of 400/500, and aspects may be utilized interchangeably. Altogether, leveraging local encryption keys for nodes in a cluster may be associated with benefits such as data security, data availability, and key management efficiency. The method 600 may begin at block 601.

At block 610, a first local encryption key for the first node of the set of member nodes may be determined. The first local encryption key may be determined with respect to a first copy of the set of replicated data. The first node of the set of member nodes may perform the determining. At block 620, the first local encryption key for the first node of the set of member nodes may be generated. The first local encryption key may be generated with respect to the first copy of the set of replicated data by the first node of the set of member nodes. At block 630, a second local encryption key for the second node of the set of member nodes may be determined. The second local encryption key may be determined with respect to a second copy of the set of replicated data. The second local encryption key may differ the first local encryption key. The second node of the set of member nodes may perform the determining. At block 640, the second local encryption key for the second node of the set of member nodes may be generated. The second local encryption key may be generated with respect to the second copy of the set of replicated data by the second node of the set of member nodes.

At block 644, the temporary key may be determined. The temporary key may be determined for utilization by both the first and second nodes of the set of member nodes. The temporary key may be determined using a key exchange technique by a key replication management engine. Generally, determining can include formulating, calculating, resolving, computing, identifying, or otherwise ascertaining the temporary key for utilization by both the first and second nodes of the set of member nodes using the key exchange technique by a key replication management engine. The key management engine may include a software module, hardware component, or service configured to manage determination, generation, assignment, expiration monitoring, and other cryptographic operations with respect to temporary keys. In embodiments, the key management engine may be a remote entity communicatively connected to the set of member nodes (e.g., physically and logically separate from the shared pool of configurable computing resources/set of member nodes), or an internal software module located within each node of the set of member nodes. In embodiments, the key management engine may be configured to use a key exchange technique to determine the temporary key. The key exchange technique may include an algorithm, widget, application, or other software program for creation of valid temporary encryption keys for use by the set of member nodes (e.g., independent of local encryption keys, which are generated by the nodes themselves). In embodiments, the key exchange technique may include a key-agreement protocol in which two or more parties (e.g., nodes) may agree on a temporary key that remains private from an unauthorized third party. As examples, the key exchange technique may include a Diffie-Hellman key exchange, public key infrastructure, web-of-trust methods, password-authenticated key agreement techniques, quantum key exchange methods, or the like. In embodiments, determining the temporary key may include submitting a temporary password generation request (e.g., by a node of the set of member nodes) to the key management engine, and receiving a temporary key generated using the key exchange technique. Other methods of determining the temporary key using the key exchange technique by the key replication management engine are also possible.

In embodiments, the key replication management engine may be configured at block 645. The key replication management engine may be configured to manage a change to one or more local encryption keys. Aspects of the disclosure relate to the recognition that, in some situations, a local encryption key currently in use by one or more nodes of the set of member nodes may be changed (e.g., updated/revised). Accordingly, aspects of the disclosure relate to configuring the key replication management engine to manage a change to one or more local encryption keys (e.g., to facilitate continuous availability with respect to the set of replicated data). Generally, configuring can include setting-up, programming, organizing, structuring, instructing, or otherwise arranging the key replication management engine to manage a change to one or more local encryption keys. In embodiments, configuring the key replication management engine may include instructing the key replication management engine to manage changes to one or more local encryption keys without data loss. For instance, in response to detecting a change with respect to a local encryption key of one or more nodes of the set of member nodes, the key replication management engine may be configured to locally store new data (e.g., modifications made since the local encryption key changed) using a temporary key (e.g., the temporary key that was used to encrypt a copy of the set of modified replicated data for transfer to other nodes), and re-encrypt the data using the new local encryption key. Other methods of configuring the key replication management engine to manage a change to one or more local encryption keys are also possible.

In embodiments, the set of replicated data may be prevented from being stored with an old local encryption key at block 646. The preventing may be performed by the key replication management engine. As described herein, aspects of the disclosure relate to the recognition that when a local encryption key for a particular node changes, in some situations it may be unclear whether recent modifications to the set of replicated data were encrypted using the old local encryption key (e.g., prior to the change) or the new local encryption key (e.g., subsequent to the change). Accordingly, aspects of the disclosure relate to preventing the set of replicated data from being stored with an old local encryption key. Generally, preventing can include avoiding, stopping, delaying, forbidding, blocking, prohibiting, limiting, or otherwise restricting the set of replicated data from being stored with an old local encryption key. The old local encryption key may include a local encryption key for a particular node of the set of member nodes prior to a change (e.g., revision/update) with respect to the local encryption key. As an example, in the event that a first local encryption key of "3048 0241 00C9 18FA CF8D" is updated to a new local encryption key of "8934 0923 11K4 71BR IC0L," the local encryption key of "3048 0241 00C9 18FA CF8D" may be considered to be the old local encryption key. In embodiments, preventing may include detecting an access request (e.g., write request) to modify the set of replicated data using the old local encryption key (e.g., subsequent to updating of the local encryption key to the new local encryption key) and blocking the access request with respect to the set of replicated data. In embodiments, preventing may include editing a set of access permissions with respect to the set of replicated data to forbid modifications to the set of replicated data using the old local encryption key to avoid data from being stored with the old local encryption key. Other methods of preventing the set of replicated data from being stored with the old local encryption key are also possible.

In embodiments, the set of replicated data utilizing the temporary key may be saved at block 647. The saving may be performed by the key replication management engine. Generally, saving can include keeping, collecting, reserving, caching, logging, recording, or otherwise storing the set of replicated data utilizing the temporary key. In embodiments, saving may include utilizing a temporary key to encrypt a set of replication data modifications (e.g., changes or updates to the set of replication data), and storing the encrypted set of replication data modifications in a separate file, folder, or digital container than the set of replicated data. In embodiments (e.g., if a change is made, the data can sent to another node with the temporary key, and the receiver node is in the midst of re-encrypting with a new local key), saving the set of replication data modifications may include utilizing the same temporary key that was used to encrypt the set of replicated data prior to transmission of the set of replicated data to one or more other nodes of the set of member nodes. In embodiments, saving the set of replication data modifications may include requesting a new temporary key from the key replication management engine, and utilizing the new temporary key to encrypt and store the set of replication data modifications. In embodiments, saving may include using the key replication management engine to store the set of replicated data modifications in local memory of the same node that maintains the set of replicated data. Other methods of saving the set of replicated data utilizing the temporary key are also possible.

In embodiments, a completion of the change to the one or more local encryption keys may be detected at block 648. The detecting may be performed by the key replication management engine. Generally, detecting can include sensing, recognizing, discovering, distinguishing, identifying, or otherwise ascertaining the completion of the change to the one or more local encryption keys. In embodiments, detecting the completion of the change to the one or more local encryption keys may include using a task manager application to monitor progress of the change (e.g., re-encryption) to the one or more local encryption keys, and sensing that the change has been completed (e.g., the set of replication data has been re-encrypted using the new local encryption key). As an example, detecting may include ascertaining that a set of replication data that had been encrypted using an old local encryption key of "3048 0241 00C9 18FA CF8D" has been re-encrypted using a new local encryption key of "8934 0923 11K4 71BR IC0L." Other methods of detecting the completion of the change to the one or more local encryption keys are also possible.

In embodiments, the set of replicated data may be updated at block 649. The updating may occur utilizing the new local encryption key. Generally, updating can include revising, editing, amending, adjusting, altering, modifying, or otherwise changing the set of replicated data utilizing the new local encryption key. In embodiments, updating the set of replicated data may include decrypting the set of replication data modifications (e.g., attempted changes made to the set of replicated data while the local encryption key was being changed from the old local encryption key to the new local encryption key) using the temporary key, and re-encrypting the set of replication data modifications using the new local encryption key. In embodiments, updating the set of replicated data may include merging the set of replicated data modifications together with the set of replicated data in a single file, folder, or digital container encrypted using the new local encryption key.

Consider the following example. A set of replicated data including a database file having 30 rows may be encrypted using a first local encryption key of "Kk4F TmsA TQgA SO0S." In embodiments, the first local encryption key may be updated (e.g. to facilitate security of the set of replicated data) to a second local encryption key of "1VL1 m58u dj52 yK56," triggering a re-encryption of the set of replicated data using the second local encryption key. In embodiments, a set of replicated data modifications including a write operation to add an additional 10 database rows to the set of replicated data may be detected prior to completion of the re-encryption of the set of replicated data using the second local encryption key (e.g., while/during the re-encryption operation is taking place). As described herein, the set of replicated data modifications may be prevented with respect to the set of replicated data (e.g., as the set of replicated data is undergoing re-encryption), and the set of replicated data modifications may be encrypted using a temporary key (e.g., the same temporary key used to encrypt the set of replicated data prior to transfer to another node of the set of member nodes). In response to detecting a completion of the change/update to the local encryption key (e.g., the set of replicated data has been re-encrypted using the second local encryption key), the set of replicated data modifications may be decrypted using the temporary key, and re-encrypted using the second local encryption key to apply the set of replication data modifications to the set of replicated data. As such, a set of modified replicated data (e.g., database file having 40 rows) that is encrypted using the second local encryption key may be generated. Other methods for local encryption of a set of replicated data are also possible.

At block 650, a temporary key for utilization by both the first and second nodes of the set of member nodes may be generated. The generating may occur to modify the set of replicated data. At block 680, the set of replicated data may be updated. The set of replicated data may be updated using the first local encryption key, the temporary key, and the second local encryption key. The updating may occur on the first and second nodes of the set of member nodes.

Method 600 concludes at block 699. Aspects of method 600 may provide performance or efficiency benefits related to local encryption of a set of replicated data in a shared pool of configurable computing resources which has a set of member nodes. Aspects may save resources such as bandwidth, processing, or memory.

Figure 7:
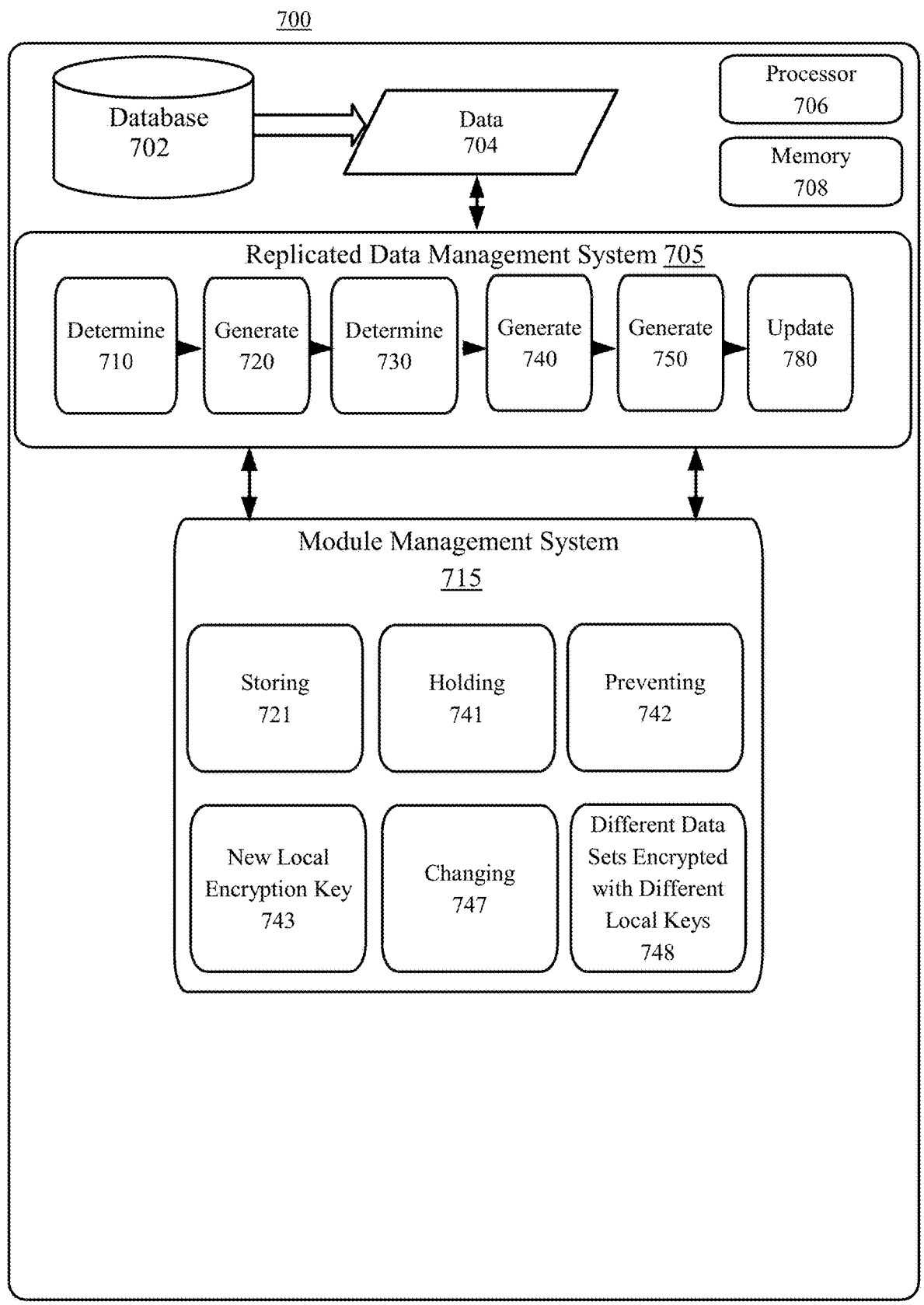
FIG. 7 shows an example system for local encryption of a set of replicated data in a shared pool of configurable computing resources which has a set of member nodes, according to embodiments.

FIG. 7 shows an example system 700 for local encryption of a set of replicated data in a shared pool of configurable computing resources which has a set of member nodes, according to embodiments. The example system 700 may include a processor 706 and a memory 708 to facilitate implementation of replicated data management. The example system 700 may include a database 702 (e.g., replicated data management database). In embodiments, the example system 700 may include a replicated data management system 705. The replicated data management system may be communicatively connected to the database 702, and be configured to receive data 704 related to replicated data. The replicated data management system may include a determining module 710 to determine a first local encryption key, a generating module 720 to generate the first local encryption key, a determining module 730 to determine a second local encryption key, a generating module 740 to generate the second local encryption key, a generating module 750 to generate a temporary key, and an updating module 780 to update the set of replicated data. The operational steps described herein may be performed dynamically (e.g., in real-time, ongoing, on-the-fly) to streamline replicated data management. The replicated data management system 705 may be communicatively connected with a module management system 715 that includes one or more modules for implementing aspects of replicated data management.

In embodiments, storing may occur at module 721. The first local encryption key for the first node of the set of member nodes with respect to the first copy of the set of replicated data may be stored. The first local encryption key may be stored in a first protected memory component of the first node of the set of member nodes. The second local encryption key for the second node of the set of member nodes with respect to the second copy of the set of replicated data may be stored. The second local encryption key may be stored in a second protected memory component of the second node of the set of member nodes. Generally, storing can include keeping, collecting, reserving, caching, logging, recording, or otherwise saving the first local encryption key for the first node in a first protected memory component of the first node and the second local encryption key for the second node in a second protected memory component of the second node. The first and second protected memory components may include portions of volatile or non-volatile computer memory of the first and second nodes, respectively, that are guarded (e.g., at a hardware level or a software level) from unauthorized access by users or other computer applications. In embodiments, the first and second protected memory components may include storage device partitions that are configured to be accessible by a limited number of operating system routines (e.g., those routines directly related to managing the local encryption keys). In embodiments, storing may include embedding the first local encryption key in the first protected memory component of the first node, and embedding the second local encryption key in the second protected memory component of the second node using one or more memory protection techniques. As examples, the memory protection techniques may include a segmentation technique (e.g., dividing computer memory into segments), a paged virtual memory technique (e.g., dividing virtual memory into equal sized pages mapped to physical memory using a page table), a protection key technique (e.g., only routines that have the correct protection key can access the protected memory components), a capability-based addressing technique (e.g., privileged instructions which may only be executed by particular software kernels), a dynamic tainting technique (e.g., identifying and preventing illegal operations to access the protected memory components) or the like. Other methods of storing the first local encryption key in the first protected memory component of the first node and storing the second local encryption key in the second protected memory component of the second node are also possible.

In embodiments, holding may occur at module 741. The first local encryption key may be held by the first node of the set of member nodes. The first local encryption key may be held without sharing with the second node of the set of member nodes. The second local encryption key may be held by the second node of the set of member nodes. The second local encryption key may be held without sharing with the first node of the set of member nodes. Generally, holding may include keeping, containing, possessing, detaining, preserving, retaining, or otherwise maintaining the first local encryption key by the first node and the second local encryption key by the second node. In embodiments, holding may include retaining the first and second local encryption keys on the first and second nodes (e.g., in a protected memory component), respectively, such that the first and second local encryption keys are not shared with (e.g., communicated, accessed, made public to) other nodes of the set of member nodes or other unauthorized entities. In embodiments, holding may include locking the first local encryption key to the first node and locking the second local encryption key to the second node such that the first and second local encryption keys may not be utilized in one or more intra-node data transfer operations. Other methods of holding the first local encryption key by the first node and holding the second local encryption key by the second node are also possible.

In embodiments, preventing may occur at module 742. A set of other computing devices may be prevented from accessing the first local encryption key. The preventing may be performed by the first node of the set of member nodes. The set of other computing devices may be prevented from accessing the second local encryption key. The preventing may be performed by the second node of the set of member nodes. Generally, preventing can include avoiding, stopping, delaying, forbidding, blocking, prohibiting, limiting, or otherwise restricting a set of other computing devices from accessing the first local encryption key or the second local encryption key. The set of other computing devices may include computing devices (e.g., servers, nodes, mobile computing devices) that are not associated with access privileges with respect to the first local encryption key or the second local encryption key (e.g., other nodes in the set of member nodes, computing devices external to the set of member nodes). In embodiments, preventing access to the first and second local encryption keys may include blocking (e.g., forbidding) a data transfer operation that would result in the first or second local encryption key being transmitted to another node of the set of member nodes. As an example, in response to the first or second node receiving an access request from another computing device (e.g., third-party computing device) to access the set of replicated data using the first or second local encryption keys, the first or second node may deny the access request and provide an unauthorized access notification to an administrator or other user. Other methods of preventing access to the first and second local encryption keys are also possible.

In embodiments, a new local encryption key may be resolved at module 743. Aspects of the disclosure, in certain embodiments, relate to periodically updating (e.g., changing, revising) the local encryption key for one or more nodes while maintaining continuous availability of the set of replication data (e.g., as the node does not need to coordinate or communicate with other nodes to change its local encryption key). The new local encryption key may be resolved by the first node of the set of member nodes to replace the first local encryption key for the first node of the set of member nodes with respect to the first copy of the set of replicated data. Generally, resolving can include formulating, calculating, resolving, computing, identifying, or otherwise ascertaining the new local encryption key to replace the first local encryption key. The new local encryption key may include a local encryption key for the first node (e.g., source node) or second node (e.g., target node) that differs from a previous local encryption key used by the first or second node. In embodiments, resolving the new local encryption key may include submitting an encryption key request to a key replication management engine (e.g., stored locally on the first or second node). The new local encryption key may be generated for the first node of the set of member nodes. The generating may occur with respect to the first copy of the set of replicated data by the first node of the set of member nodes. Generally, generating can include producing, computing, formulating, calculating, assembling, structuring, assigning, establishing, or otherwise creating the new local encryption key for the first node (e.g., or the second node) of the set of member nodes. In embodiments, generating the local encryption key may include utilizing an encryption key algorithm (e.g., pseudorandom number generator, passphrase and key derivation-function, symmetric-key algorithm, public/private key algorithm) or hashing function (e.g., tabulation hashing, Zobrist hashing, universal one-way hash, Rabin fingerprint) to compute the new local encryption key for the first node. In embodiments, generating (e.g., and resolving) may be performed on a periodic temporal basis. As an example, in certain embodiments, the first node may be configured to resolve and generate a new local encryption key every 4 hours, every 12 hours, once a day, once a week, or in response to detecting elapsing of another predetermined time period. In embodiments, the generating (e.g., and resolving) may be performed in response to a triggering event. As an example, the first node may be configured to resolve and generate a new local encryption key in response to detecting 10 data transfers of the set of replicated data to another node or nodes, detecting 5 modifications that have been performed with respect to the set of replicated data, sensing that 3 other nodes of the set of member nodes have updated their own local encryption keys, or the like. In embodiments, the new local encryption key may be saved in a protected memory component (e.g., replacing the old local encryption key) such that it is guarded against unauthorized access. In embodiments, in response to generation of the new local encryption key, the set of replicated data may be decrypted using the old local encryption key and re-encrypted using the new local encryption key.

In embodiments, the first local encryption key may be deactivated for the first node of the set of member nodes. The deactivating may occur with respect to the first copy of the set of replicated data by the first node of the set of member nodes. Generally, deactivating can include voiding, expiring, nullifying, decommissioning, revoking, deleting, removing, or otherwise invalidating the first local encryption key for the first node of the set of member nodes. Deactivating the first local encryption key may include invalidating the first local encryption key such that it may longer be used for encryption and decryption operations with respect to the set of replicated data on the first node. In embodiments, deactivating can include modifying an encryption key permission log to tag, flag, mark, or otherwise indicate that the first local encryption key is invalid, and revoke cryptographic operation privileges with respect to the first local encryption key. In embodiments, a new temporary key may be generated for utilization by both the first and second nodes of the set of member nodes. The generating may occur to modify the set of replicated data. Generally, generating can include producing, computing, formulating, calculating, assembling, structuring, assigning, establishing, or otherwise creating the new temporary key for utilization by both the first and second nodes of the set of member nodes. The new temporary key may include a transitory or provisional encryption key that differs from a previous temporary key (e.g., such that a second data transfer of the set of replicated data between the set of member nodes may be carried out using a different temporary key than the first data transfer). In embodiments, generating may include using the key exchange technique of the key replication management engine to formulate the new temporary key (e.g., using a Diffie-Hellman key exchange technique).

In embodiments, the set of replicated data may be updated. The set of replicated data may be updated using the new local encryption key, the new temporary key, and the second local encryption key. The set of replicated data may be updated on the first and second nodes of the set of member nodes. Generally, updating can include revising, editing, amending, adjusting, altering, modifying, or otherwise changing the set of replicated data using the new local encryption key, the new temporary key, and the second local encryption key. In embodiments, updating the set of replicated data may include decrypting the set of replicated data using the new local encryption key to decrypt a first copy of the set of replicated data, modifying the set of replicated data on the first node to establish a package which has a set of modified replicated data, encrypting the package using the new temporary key, transferring the package from the first node to the second node, and decrypting the package which has the set of modified replicated data on the second node using the second local encryption key. Other methods of updating the set of replicated data using the new local encryption key, the new temporary key, and the second local encryption key are also possible.

In embodiments, changing may occur at module 747. The first local encryption key may be changed in a first key-change temporal window. The second local encryption key may be changed in a second key-change temporal window. The second key-change temporal window may not overlap with the first key-change temporal window. As described herein, aspects of the disclosure relate to the recognition that changing and updating local encryption keys may be associated with re-encryption of the set of replicated data, such that the set of replicated data is not available for access while it is being re-encrypted with the new local encryption key. Accordingly, aspects of the disclosure relate to changing encryption keys for different nodes during different temporal windows, such that encrypting (e.g., re-encrypting) of each copy of the set of replicated data occurs in a staggered fashion to maintain continuous availability of the set of replicated data (e.g., so that at least one copy of the set of replicated data is available for access at all times). Generally, changing may include revising, editing, amending, adjusting, altering, updating, or otherwise modifying the first local encryption key in the first key-change temporal window and modifying the second local encryption key in the second key-change temporal window. The first and second key-change temporal windows may include time frames, periods, durations, or spans during which changing (e.g., updating) of the first and second local encryption keys occurs. As examples, the first and second key-change temporal windows may include designated time frames (e.g., 10:00-11:00 AM), relative sequences with respect to other nodes of the set of member nodes (e.g., 5th in line), points in time based on one or more triggering events (e.g., after encryption completes on an 9th node), or the like. In embodiments, changing may include assigning designated key-change temporal windows for each node of the set of member nodes during which the local encryption key for that node may be changed (e.g., changes of the local encryption key outside of the assigned key-change temporal windows are not allowed). For instance, a first set of key-change temporal windows of "6:00-6:15 AM," "10:00-10:15 AM," "2:00-2:

15 PM," "6:00-6:15 PM," and "10:00-10:15 PM" may be assigned for a first node, and a second set of key-change temporal windows of "8:30-8:45 AM," "12:30-12:45 PM," "4:30-4:45 PM," "8:30-8:45 PM," and "12:30-12:45 AM" may be assigned for a second node. Accordingly, the first and second nodes may be freely allowed to change their respective local encryption keys at any time during their assigned key-change temporal windows. As such, changing of the local encryption keys for the first and second nodes may take place in a temporally-staggered fashion such that the set of replicated data is continuously available on at least one node of the set of member nodes. Other methods of changing the first and second local encryption keys in the first and second key-change temporal windows are also possible.

In embodiments, different data sets encrypted with different local encryption keys may occur at module 748. Aspects of the disclosure, in embodiments, relate to using different local encryption keys to encrypt different data sets on the same node (e.g., different users may use different software products, different services, or different local encryption keys to encrypt data). In embodiments, a third local encryption key for the first node of the set of member nodes may be determined by the first node of the set of member nodes. The third local encryption key may be determined with respect to a first copy of a set of duplicated data. The third local encryption key may differ from both the first and second local encryption keys. The set of duplicated data may include a collection of information shared between one or more nodes of the set of member nodes. The set of duplicated data may differ from (e.g., not overlap with, substantially differ from) the set of replicated data. The first copy of the set of duplicated data may include a version of the set of duplicated data that is maintained on the first node of the set of member nodes. In embodiments, determining the third local encryption key may include utilizing the key replication management engine to formulate a third local encryption key for the first copy of the set of duplicated data on the first node.

In embodiments, the third local encryption key for the first node of the set of member nodes may be generated. The third local encryption key may be generated with respect to the first copy of the set of duplicated data by the first node of the set of member nodes. In embodiments, generating the third local encryption key may include pairing, linking, coupling, or otherwise associating the third local encryption key with the first node. In embodiments, generating may include computing the third local encryption key and storing it in a protected memory component of the first node together with the first local encryption key. In embodiments, a fourth local encryption key for the second node of the set of member nodes may be determined. The fourth local encryption key may be determined with respect to a second copy of the set of duplicated data. The fourth local encryption key may differ from each of the first, second, and third local encryption keys. The determining may be performed by the second node of the set of member nodes. In embodiments, the fourth local encryption key may be determined using a cryptographic algorithm configured to use a hardware characteristic of the second node as a seed value. The fourth local encryption key for the second node of the set of member nodes may be generated. The fourth local encryption key may be generated with respect to the second copy of the set of duplicated data by the second node of the set of member nodes. In embodiments, generating may include creating the fourth local encryption key and storing it in a protected memory component for the second node. A different temporary key may be generated for utilization by both the first and second nodes of the set of member nodes. The different temporary key may be generated to modify the set of duplicated data. The different temporary key may include a temporary key that differs from temporary keys generated for previous data transfers between nodes of the set of member nodes. The different temporary key may be generated using a key-exchange technique by the key replication management engine. The set of duplicated data may be updated (e.g., using the third local encryption key, the different temporary key, and the fourth local encryption key). The updating may occur on the first and second nodes of the set of member nodes. As described herein, updating may include using the third local encryption key to decrypt the first copy of the set of duplicated data, modifying the set of duplicated data to establish a package which has a set of modified duplicated data, encrypting the package using the different temporary key, transferring the package from the first node to the second node, and decrypting the package using the fourth local encryption key. Other methods of encrypting different data sets with different local encryption keys are also possible.

Consider the following example. A first node may include both a first copy of a set of replicated data related to source code for a streaming application as well as a first copy of a set of duplicated data related to quarterly budget information for a business project. In embodiments, the first node may be configured to encrypt the first copy of the set of replicated data and the first copy of the set of duplicated data using different local encryption keys. As an example, the first node may encrypt the first copy of the set of replicated data using a first local encryption key of "M94U Z1la 6g8O 5UmO" and encrypt the first copy of the set of duplicated data using a third local encryption key of "Sc2e gNkC kh2L Mhn4." Accordingly, in embodiments, in response to detecting a change with respect to one or more of the first copy of the set of replicated data or the first copy of the set of duplicated data, it may be desirable to transfer the data to one or more other nodes of the set of member nodes (e.g. to synchronize the changes). As such, the first copy of the set of replicated data may be decrypted using the first local encryption key, the first copy of the set of duplicated data may be decrypted using the third local encryption key, and both the first copy of the set of replicated data and the first copy of the set of duplicated data may be encrypted using different temporary keys and transferred to one or more nodes of the set of member nodes. As described herein, the target nodes (e.g., recipients of the transferred data) may be configured to decrypt the received data using the respective temporary keys, and re-encrypt the data using their own local encryption keys. Other methods of encrypting different data sets with different local encryption keys are also possible.

Figure 8:
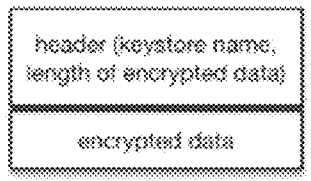
FIG. 8 illustrates example types of data entries related to local encryption of a set of replicated data in shared pool of configurable computing resources which has a set of member nodes, according to embodiments.
Figure 8:
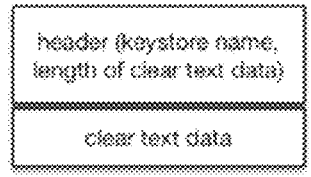
Figure 8:

FIG. 8 illustrates example types of data entries 800 related to local encryption of a set of replicated data in shared pool of configurable computing resources which has a set of member nodes, according to embodiments. The example types of data entries 800 may illustrate different formatting structures for the set of replicated data at different stages of the local encryption process. In embodiments, the example types of data entries 800 may include a read entry 810. The read entry 810 may include a data entry for maintaining the set of replicated data (e.g., on a node of the set of member nodes) in a database, repository, or other data store. As shown in FIG. 8, the read entry 810 may include an unencrypted header that indicates the keystore name (e.g., location of the keystore file, where the local encryption key is stored) and the data size (e.g., length, volume) of the encrypted data, together with the set of replicated data in an encrypted form (e.g., cyphertext). In certain embodiments, the read entry 810 may be encrypted using a local encryption key (e.g., first local encryption key on the first node). In embodiments, the example types of data entries 800 may include a change entry 820. The change entry 820 may include a data entry for accepting changes and modifications to the set of replicated data. The change entry 820 may include an unencrypted header that indicates the location of the keystore file, as well as the set of replicated data in an unencrypted form (e.g., clear text). In embodiments, one or more changes or modifications may be made to the set of replicated data in the change entry 820. In embodiments, the example types of data entries 800 may include a broadcast entry 830. The broadcast entry 830 may include a data entry for transferring the set of replicated data between nodes of the set of member nodes. The broadcast entry 830 may be completely encrypted with a temporary key such that the both the set of replicated data and the header are encoded in cyphertext. As described herein, the broadcast entry 830 may be received by a target node, where it may be decrypted using the temporary key and re-encrypted using a local encryption key of the target node. Other types of data entries for managing the set of replicated data are also possible.

Figure 9:
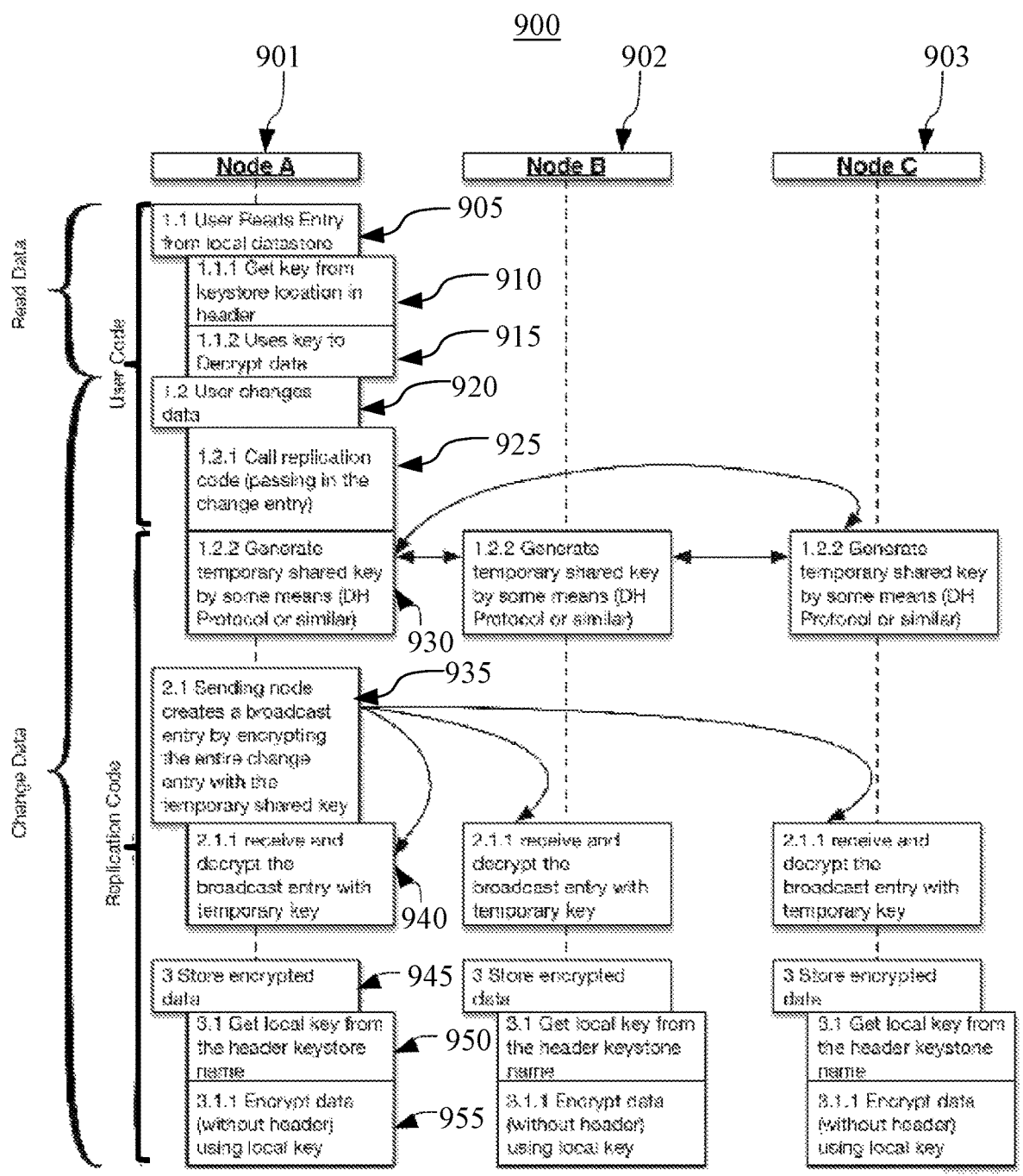
FIG. 9 is a flowchart illustrating a method for local encryption of a set of replicated data in shared pool of configurable computing resources which has a set of member nodes, according to embodiments.

FIG. 9 is a flowchart illustrating a method 900 for local encryption of a set of replicated data in shared pool of configurable computing resources which has a set of member nodes, according to embodiments. In embodiments, at block 905, a read entry of a set of replicated data may be selected from a local datastore on Node A 901. The read entry may be identified using an entry identifier. A local encryption key may be retrieved from a keystore location at block 910 based on a keystore identifier indicated by a header of the read entry. At block 915, the local encryption key may be used to decrypt the read entry. At block 920, a modification (e.g., new creation, deletion, edit) may be performed with respect to the entry. In response to the modification, the read entry may be converted (e.g., passed) to a change entry at block 925 (e.g., by a replication service). At block 930, a temporary key may be generated to facilitate secure transfer of the set of replication data. In embodiments, the temporary key may be generated using a key exchange technique (e.g., Diffie-Hellman technique) such that Node A 901, Node B 902, and Node C 903 each have the temporary key. At block 935, Node A 901 may create a broadcast entry from the change entry by encrypting the change entry with the temporary key. The broadcast entry may be sent to Node B 902 and Node C 903. At block 940, Node B 902 and Node C 903 may receive the broadcast entry and decrypt it with the temporary key (e.g., converting the broadcast entry back to the original change entry). At block 945, each node may store the change entry in local storage. At block 950, each node may independently retrieve a local encryption key from the keystore specified by the header of the change entry (e.g., second local encryption key for Node B 902, third local encryption key for Node C 903). At block 955, each node may use its respective local encryption key to encrypt the change entry and store it in a local data store (e.g., converting the change entry to a read entry). Other methods of local encryption of a set of replicated data in shared pool of configurable computing resources are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for local encryption of a set of replicated data in a shared pool of configurable computing resources which has a set of member nodes, the method comprising:
    determining, by a first node of the set of member nodes, a first local encryption key for the first node of the set of member nodes with respect to a first copy of the set of replicated data;
    parsing a hardware configuration of the first node to identify a first unique hardware identifier;
    generating, with respect to the first copy of the set of replicated data by the first node of the set of member nodes, the first local encryption key for the first node of the set of member nodes using the first unique hardware identifier as a seed value;
    determining, by a second node of the set of member nodes, a second local encryption key for the second node of the set of member nodes with respect to a second copy of the set of replicated data, wherein the second local encryption key differs from the first local encryption key;
    generating, with respect to the second copy of the set of replicated data by the second node of the set of member nodes, the second local encryption key for the second node of the set of member nodes based on a second unique hardware identifier for the second node;
    generating, to modify the set of replicated data, a temporary key for utilization by both the first and second nodes of the set of member nodes, wherein the temporary key is used for one encryption operation and one decryption operation before being invalidated; and
    updating, on the first and second nodes of the set of member nodes, the set of replicated data using the first local encryption key, the temporary key, and the second local encryption key.

2. The method of claim 1, further comprising:
    expiring, in response to using the temporary key to modify the set of replicated data, the temporary key.

3. The method of claim 1, further comprising:
    decrypting, by the first node of the set of member nodes, the first copy of the set of replicated data using the first local encryption key;
    modifying the set of replicated data on the first node of the set of member nodes to establish a package which has a set of modified replicated data;
    encrypting, by the first node using the temporary key, the package which has the set of modified replicated data;
    transferring, from the first node to the second node, the package which has the set of modified replicated data; and
    decrypting, by the second node using the temporary key, the package which has the set of modified replicated data.

4. The method of claim 3, further comprising:
    saving, by the first node of the set of member nodes, the set of modified replicated data as the first copy of the set of replicated data on the first node of the set of member nodes;
    saving, by the second node of the set of member nodes, the set of modified replicated data as the second copy of the set of replicated data on the second node of the set of member nodes;
    encrypting, on the first node of the set of member nodes by the first node of the set of member nodes, the first copy of the set of replicated data using the first local encryption key; and
    encrypting, on the second node of the set of member nodes by the second node of the set of member nodes, the second copy of the set of replicated data using the second local encryption key.

5. The method of claim 4, further comprising:
    encrypting, on the first node of the set of member nodes by the first node of the set of member nodes, the first copy of the set of replicated data using the first local encryption key in a first encryption temporal window; and
    encrypting, on the second node of the set of member nodes by the second node of the set of member nodes, the second copy of the set of replicated data using the second local encryption key in a second encryption temporal window which differs from the first encryption temporal window.

6. The method of claim 3, further comprising:
    establishing the package which includes:
        a keystore identifier which indicates one or more locations of one or more local encryption keys for a cryptographic operation,
        a data size, and
        the set of modified replicated data.

7. The method of claim 1, further comprising:
determining, using a key exchange technique by a key replication management engine, the temporary key for utilization by both the first and second nodes of the set of member nodes.

8. The method of claim 7, further comprising:
configuring the key replication management engine to manage a change to one or more local encryption keys.

9. The method of claim 8, further comprising:
preventing, by the key replication management engine, the set of replicated data from being stored with an old local encryption key;
saving, by the key replication management engine, the set of replicated data utilizing the temporary key;
detecting, by the key replication management engine, a completion of the change to the one or more local encryption keys; and
updating, utilizing the new local encryption key, the set of replicated data.

10. The method of claim 1, further comprising:
holding, without sharing with the second node of the set of member nodes, the first local encryption key by the first node of the set of member nodes; and
holding, without sharing with the first node of the set of member nodes, the second local encryption key by the second node of the set of member nodes.

11. The method of claim 10, further comprising:
preventing, by the first node of the set of member nodes, a set of other computing devices from accessing the first local encryption key; and
preventing, by the second node of the set of member nodes, the set of other computing devices from accessing the second local encryption key.

12. The method of claim 1, further comprising:
resolving, by the first node of the set of member nodes, a new local encryption key for the first node of the set of member nodes with respect to the first copy of the set of replicated data to replace the first local encryption key for the first node of the set of member nodes with respect to the first copy of the set of replicated data;
generating, with respect to the first copy of the set of replicated data by the first node of the set of member nodes, the new local encryption key for the first node of the set of member nodes;
deactivating, with respect to the first copy of the set of replicated data by the first node of the set of member nodes, the first local encryption key for the first node of the set of member nodes;
generating, to modify the set of replicated data, a new temporary key for utilization by both the first and second nodes of the set of member nodes; and
updating, on the first and second nodes of the set of member nodes, the set of replicated data using the new local encryption key, the new temporary key, and the second local encryption key.

13. The method of claim 1, further comprising:
storing, in a first protected memory component of the first node of the set of member nodes, the first local encryption key for the first node of the set of member nodes with respect to the first copy of the set of replicated data; and
storing, in a second protected memory component of the second node of the set of member nodes, the second local encryption key for the second node of the set of member nodes with respect to the second copy of the set of replicated data.

14. The method of claim 1, further comprising:
changing the first local encryption key in a first key-change temporal window; and
changing the second local encryption key in a second key-change temporal window which does not overlap with the first key-change temporal window.

15. The method of claim 1, further comprising:
determining, by the first node of the set of member nodes, a third local encryption key for the first node of the set of member nodes with respect to a first copy of a set of duplicated data, wherein the third local encryption key differs from both the first and second local encryption keys;
generating, with respect to the first copy of the set of duplicated data by the first node of the set of member nodes, the third local encryption key for the first node of the set of member nodes;
determining, by the second node of the set of member nodes, a fourth local encryption key for the second node of the set of member nodes with respect to a second copy of the set of duplicated data, wherein the fourth local encryption key differs from each of the first, second, and third local encryption keys;
generating, with respect to the second copy of the set of duplicated data by the second node of the set of member nodes, the fourth local encryption key for the second node of the set of member nodes;
generating, to modify the set of duplicated data, a different temporary key for utilization by both the first and second nodes of the set of member nodes; and
updating, on the first and second nodes of the set of member nodes, the set of duplicated data using the third local encryption key, the different temporary key, and the fourth local encryption key.

16. The method of claim 1, further comprising:
executing, in a dynamic fashion to streamline local encryption of the set of replicated data in the shared pool of configurable computing resources which has the set of member nodes, each of:
the determinings, the generatings, and the updating.

17. The method of claim 1, further comprising:
executing, in an automated fashion without user intervention, each of:
the determinings, the generatings, and the updating.

18. The method of claim 1, further comprising:
holding, without sharing with the second node of the set of member nodes, the first local encryption key by the first node of the set of member nodes;
holding, without sharing with the first node of the set of member nodes, the second local encryption key by the second node of the set of member nodes;
preventing, by the first node of the set of member nodes, a set of other computing devices from accessing the first local encryption key;
preventing, by the second node of the set of member nodes, the set of other computing devices from accessing the second local encryption key;
decrypting, by the first node of the set of member nodes, the first copy of the set of replicated data using the first local encryption key;
modifying the set of replicated data on the first node of the set of member nodes to establish a package which has a set of modified replicated data;
determining, using a key exchange technique by a key replication management engine, the temporary key for utilization by both the first and second nodes of the set of member nodes;

encrypting, by the first node using the temporary key, the package which has the set of modified replicated data;

transferring, from the first node to the second node, the package which has the set of modified replicated data;

decrypting, by the second node using the temporary key, the package which has the set of modified replicated data;

saving, by the first node of the set of member nodes, the set of modified replicated data as the first copy of the set of replicated data on the first node of the set of member nodes;

saving, by the second node of the set of member nodes, the set of modified replicated data as the second copy of the set of replicated data on the second node of the set of member nodes;

encrypting, on the first node of the set of member nodes by the first node of the set of member nodes, the first copy of the set of replicated data using the first local encryption key;

encrypting, on the second node of the set of member nodes by the second node of the set of member nodes, the second copy of the set of replicated data using the second local encryption key; and expiring, in response to using the temporary key to modify the set of replicated data, the temporary key.

19. A system for local encryption of a set of replicated data in a shared pool of configurable computing resources which has a set of member nodes, the system comprising:

a memory having a set of computer readable computer instructions, and a processor for executing the set of computer readable instructions, the set of computer readable instructions including:

determining, by a first node of the set of member nodes, a first local encryption key for the first node of the set of member nodes with respect to a first copy of the set of replicated data;

parsing a hardware configuration of the first node to identify a first unique hardware identifier;

generating, with respect to the first copy of the set of replicated data by the first node of the set of member nodes, the first local encryption key for the first node of the set of member nodes using the first unique hardware identifier as a seed value;

determining, by a second node of the set of member nodes, a second local encryption key for the second node of the set of member nodes with respect to a second copy of the set of replicated data, wherein the second local encryption key differs from the first local encryption key;

generating, with respect to the second copy of the set of replicated data by the second node of the set of member nodes, the second local encryption key for the second node of the set of member nodes based on a second unique hardware identifier for the second node;

generating, to modify the set of replicated data, a temporary key for utilization by both the first and second nodes of the set of member nodes, wherein the temporary key is used for one encryption operation and one decryption operation before being invalidated; and updating, on the first and second nodes of the set of member nodes, the set of replicated data using the first local encryption key, the temporary key, and the second local encryption key.

20. A computer program product for local encryption of a set of replicated data in a shared pool of configurable computing resources which has a set of member nodes, the computer program product comprising a computer readable storage medium having program instructions embodied therewith, wherein the computer readable storage medium is not a transitory signal per se, the program instructions executable by a processor to cause the processor to perform a method comprising:

determining, by a first node of the set of member nodes, a first local encryption key for the first node of the set of member nodes with respect to a first copy of the set of replicated data;

parsing a hardware configuration of the first node to identify a first unique hardware identifier;

generating, with respect to the first copy of the set of replicated data by the first node of the set of member nodes, the first local encryption key for the first node of the set of member nodes using the first unique hardware identifier as a seed value;

determining, by a second node of the set of member nodes, a second local encryption key for the second node of the set of member nodes with respect to a second copy of the set of replicated data, wherein the second local encryption key differs from the first local encryption key;

generating, with respect to the second copy of the set of replicated data by the second node of the set of member nodes, the second local encryption key for the second node of the set of member nodes based on a second unique hardware identifier for the second node;

generating, to modify the set of replicated data, a temporary key for utilization by both the first and second nodes of the set of member nodes, wherein the temporary key is used for one encryption operation and one decryption operation before being invalidated; and updating, on the first and second nodes of the set of member nodes, the set of replicated data using the first local encryption key, the temporary key, and the second local encryption key.

* * * * *